United States Patent
Dohi et al.

(10) Patent No.: US 9,695,914 B2
(45) Date of Patent: Jul. 4, 2017

(54) TOROIDAL CONTINUOUSLY VARIABLE TRANSMISSION AND CONTINUOUSLY VARIABLE TRANSMISSION APPARATUS

(71) Applicant: NSK Ltd., Tokyo (JP)

(72) Inventors: Nagao Dohi, Fujisawa (JP); Hiroki Nishii, Fujisawa (JP); Norihisa Kobayashi, Fujisawa (JP); Tomohiro Inoue, Fujisawa (JP); Masahiro Kita, Fujisawa (JP)

(73) Assignee: NSK LTD. (JP)

( * ) Notice: Subject to any disclaimer, the term of this patent is extended or adjusted under 35 U.S.C. 154(b) by 0 days.

(21) Appl. No.: 15/023,056

(22) PCT Filed: Sep. 12, 2014

(86) PCT No.: PCT/JP2014/074293
§ 371 (c)(1),
(2) Date: Mar. 18, 2016

(87) PCT Pub. No.: WO2015/041181
PCT Pub. Date: Mar. 26, 2015

(65) Prior Publication Data
US 2016/0230856 A1    Aug. 11, 2016

(30) Foreign Application Priority Data

Sep. 20, 2013  (JP) .................. 2013-194930
Jan. 31, 2014  (JP) .................. 2014-016723

(51) Int. Cl.
*F16H 15/38*   (2006.01)
*F16H 37/08*   (2006.01)

(52) U.S. Cl.
CPC ......... *F16H 15/38* (2013.01); *F16H 37/0853* (2013.01); *F16H 2015/383* (2013.01)

(58) Field of Classification Search
None
See application file for complete search history.

(56) References Cited

U.S. PATENT DOCUMENTS 6,561,941 B2 *   5/2003   Nakano ................. F16H 37/086
                                                          475/214
6,872,162 B2 *   3/2005   Inoue ...................... F16H 15/38
                                                          475/216

(Continued)

FOREIGN PATENT DOCUMENTS

JP    H10-047448 A   2/1998
JP    2002-130412 A  5/2002

(Continued)

OTHER PUBLICATIONS

International Search Report date of mailing Dec. 16, 2014 for PCT/JP2014/074293 and English translation of the same. (4 pages).

*Primary Examiner* — Dirk Wright
(74) *Attorney, Agent, or Firm* — Fitch Even Tabin & Flannery LLP

(57) ABSTRACT

Construction is achieved whereby durability is maintained while size and weight are reduced. Installation plate sections are provided on the top and bottom end sections of a pair of support columns. Bolts are inserted through through-holes that penetrate through the installation plate sections in the axial direction; the bolts are then screwed into screw holes provided in the axial direction of anchor sections of an actuator body and a connecting plate, and the bolts are further tightened, whereby the support columns are securely joined and fastened to the actuator body and the connecting plate.

6 Claims, 22 Drawing Sheets

(56) References Cited

U.S. PATENT DOCUMENTS

| | | | | |
|---|---|---|---|---|
| 7,118,462 B2* | 10/2006 | Hirata | ............... | B24B 19/06 |
| | | | | 451/406 |
| 7,195,576 B2* | 3/2007 | Toyoda | ............... | F16H 15/38 |
| | | | | 475/216 |
| 7,326,146 B2* | 2/2008 | Miyata | ............... | F16H 37/086 |
| | | | | 476/40 |
| 8,167,760 B2* | 5/2012 | Nishii | ............... | F16H 15/38 |
| | | | | 475/214 |
| 2002/0049113 A1 | 4/2002 | Watanabe et al. | | |
| 2013/0053211 A1* | 2/2013 | Fukuda | ............... | F16H 15/38 |
| | | | | 476/10 |
| 2013/0260954 A1* | 10/2013 | Arai | ............... | F16H 15/38 |
| | | | | 476/40 |
| 2017/0045123 A1* | 2/2017 | Kishida | ............... | F16H 57/021 |

FOREIGN PATENT DOCUMENTS

| | | |
|---|---|---|
| JP | 2003-083436 A | 3/2003 |
| JP | 2003-090403 A | 3/2003 |
| JP | 2004-084712 A | 3/2004 |
| JP | 2005-220983 A | 8/2005 |
| JP | 2008-261471 A | 10/2008 |
| JP | 2011-149481 A | 8/2011 |

* cited by examiner

TOROIDAL CONTINUOUSLY VARIABLE TRANSMISSION AND CONTINUOUSLY VARIABLE TRANSMISSION APPARATUS

CROSS-REFERENCE TO RELATED APPLICATIONS

This application is a U.S. national phase application filed under 35 U.S.C. §371 of International Application PCT/JP2014/074293, filed on Sep. 12, 2014, designating the United States, which claims priority from Japanese Application Number 2013-194930, filed Sep. 20, 2013, and Japanese Application Number 2014-016723, filed Jan. 31, 2014, which are hereby incorporated herein by reference in their entirety.

TECHNICAL FIELD

The present invention relates to a toroidal continuously variable transmission and a continuously variable transmission apparatus in which the toroidal continuously variable transmission is assembled.

BACKGROUND ART

Toroidal continuously variable transmissions are used in automobile transmissions, or as transmissions for adjusting the operating speeds of various kinds of industrial machinery such as pumps. Continuously variable transmissions having a wide transmission gear ratio that is increased by combining a toroidal continuously variable transmission with a planetary-gear transmission have also been proposed.

FIG. 18 to FIG. 21 illustrate an example of a continuously variable transmission apparatus that is formed by combining a toroidal continuously variable transmission and planetary-gear transmission as disclosed in JP 2004-084712 (A). This continuously variable transmission apparatus is formed by combining a toroidal continuously variable transmission unit 1 that is the toroidal continuously variable transmission and a planetary-gear transmission 2 that is a differential gear unit that includes a 3-step unit having an initial step, middle step and final step, by way of a low-speed clutch 3 and a high-speed clutch 4. By switching the connected and disconnected states of the low-speed clutch 3 and the high-speed clutch 4, and by adjusting the transmission-gear ratio of the toroidal continuously variable transmission unit 1, it is possible to infinitely adjust the transmission-gear ratio between the rotating input shaft 5 and output shaft 6. In other words, by adjusting the transmission-gear ratio of the toroidal continuously variable transmission unit 1 in the low-speed mode, which is a state in which the low-speed clutch 3 is connected and the high-speed clutch 4 is disconnected, the output shaft 6 is able to be rotated in both directions from the stopped state, while the input shaft 5 continues to rotate in one direction. On the other hand, in the high-speed mode, which is a state in which the high-speed clutch 4 is connected and the low-speed clutch 3 is disconnected, as the transmission-gear ratio of the toroidal continuously variable transmission unit 1 is changed toward the side of increased speed, it is also possible to change the transmission-gear ratio of the entire continuously variable transmission apparatus toward the side of increased speed.

This kind of toroidal continuously variable transmission unit 1 includes: a pair of input disks 7a, 7b, which is a pair of outside disks; a single integrated output disk 8, which is an inside disk; and plural power rollers 9. The pair of input disks 7a, 7b are arranged so as to be concentric with each other by way of an input shaft 5, and so as to be able to freely rotate in synchronization with each other. The output disk 8 is arranged between the pair of input disks 7a, 7b so as to be concentric with the input disks 7a, 7b, and so as to be able to rotate relative to the input disks 7a, 7b. The power rollers 9 are held in the axial direction respectively between both side surfaces in the axial direction of the output disk 8 and one side surfaces in the axial direction of the input disks 7a, 7b. The power rollers 9 rotate with the rotation of the input disks 7a, 7b, and transmit power from the input disks 7a, 7b to the output disk 8. In this specification, the "axial direction", unless stated otherwise, is the axial direction of the input disks and output disk.

The output disk 8 is rotatably supported by a pair of rolling bearings such as a pair of ball bearings 10, which are thrust angular bearings on both end sections in the axial direction thereof. The power rollers 9 are rotatably supported respectively by the inner side surfaces of corresponding trunnions 11, which are support members. A pair of support plates 12a, 12b for supporting both end sections of the trunnion 11 are provided on the inside of a casing 13 by way of an actuator body 14, a connecting plate 15 and a pair of support columns 16. The support columns 16 are respectively constructed by mutually connecting support-post sections 17a, 17b that are provided on opposite sides in the radial direction of the input shaft 5 so as to be concentric with each other, the outer-circumferential surfaces of which are spherical convex surfaces, by a support-ring section 18 having a circular through hole 18a. The input shaft 5 is inserted through the inside of the through holes 18a of the support-ring sections 18.

The bottom end sections of the support columns 16 are positioned on the top surface of the actuator body 14 by uneven engagement, and joined and fastened by bolts 19. In other words, the rod sections 20 of the bolts 19 are inserted through through holes 23 that are formed in a lid body 21 and through holes 24 that are formed in a main body 22 of the actuator body 14, and the tip-end sections of the bolts 19 protrude from the top surface of the main body 22. The tip-end sections of the bolts 19 are screwed into screw holes 25 that are formed so as to be open on the bottom surfaces of the bottom sections of the support columns 16 (portions that include support-post sections 17a), and further tightened to join and fasten the bottom end sections of the support columns 16 to the actuator body 14. By firmly fitting the bottom end sections of the support columns 16 on the top surface of actuator body 14 in concave engagement sections 26 that are formed so as to surround the top-end openings of the through holes 24 of the main body 22 so that there is no looseness, it is possible to position the support columns 16 with respect to the actuator body 14. On the other hand, the top-end sections of the support columns 16 are joined and fastened to the bottom surface of a connecting plate 15 that is fastened on the inside of the casing 13 by bolts 27, the installation position thereof being regulated by uneven engagement. In other words, the rod sections 28 of the bolts 27 are inserted through through holes 29 that are formed in the connecting plate 15, and the tip-end sections of the bolts 27 protrude from the bottom surface of the connecting plate 15. The tip-end sections of the bolts 27 screw into screw holes 30 that are formed so as to be open on the top surfaces of the top end sections of the support columns 16 (portions that include the support-post sections 17b on the top side), and then further tightened to join and fasten the top end sections of the support columns 16 to the connecting plate 15. In this way, the pair of support columns 16 are provided so as to span between the top surface of the actuator body 14 and the bottom surface of the connecting plate 15. Support holes 31a that are formed in the support plate 12a on the bottom side fit around the outside of the support-post sections 17a on the bottom side of the support columns 16 so that there is no looseness. Moreover, support holes 31b that are formed in the support plate 12b on the top side fit around the outside of the support-post sections 17b on the top side of the support columns 16 so that there is no looseness.

The actuator body 14 is the portion that houses the main-unit section of the actuators (not illustrated in the figures) for causing the trunnions 11 to displace in the axial direction of the rolling shafts 11a that are provided on both end sections of the trunnions 11, and is fastened to the bottom section of the casing 13. In order for this, a stepped section 32 is formed in the portion near the opening on the bottom end of the inner surface of the casing 13, and bolt-insertion holes 33 (see FIG. 21) are formed in the portions near both ends in the width direction (front-back direction in FIG. 18 and FIG. 19, and left-right direction in FIG. 20) of the actuator body 14. When fastening the actuator body 14 to the inside of the casing 13, the portions near both ends in the width direction of the top surface of the actuator body 14 come in contact with the stepped section 32. Then, bolts (not illustrated in the figure) are inserted through the bolt-insertion holes 33 from the bottom and screwed into screw holes that are opened in the stepped section 32, and further tightened. On the other hand, the connecting plate 15 is located on the top-end section of the inside of the casing 13 with the position in the length direction (left-right direction in FIG. 18 and FIG. 19, and front-back direction in FIG. 20) and width direction being regulated. In order for this, a positioning sleeve 35 spans between the top surface of the connecting plate 15 and the bottom surface of the top-plate section 34 of the casing 13. Both end sections in the axial direction of the output disk 8 are rotatably supported by ball bearings 10 in the support-ring sections 18, which are provided in the middle section of the pair of support columns 16 that are fastened in a specified position inside the casing 13.

In this kind of continuously variable transmission apparatus, making the support rigidity in the axial direction of the pair of support columns 16 with respect to the actuator body 14 and connecting plate 15 as high as possible is desirable. In other words, during operation, forces in opposing directions that are applied from the pair of input disks 7a, 7b to the both side surfaces in the axial direction of the output disk 8 by way of the power rollers 9 cancel each other out inside the output disk 8 when the torques that are transmitted to the output disk 8 from both input disks 7a, 7b are equal. However, when friction loss occurs in the planetary-gear transmission 2 that is provided on the outside in the axial direction of one input disk 7b of the pair of input disks 7a, 7b, and it is not possible to balance the forces in opposing directions that are applied to the both side surfaces in the axial direction of the output disk 8, a force in the axial direction (thrust load) is applied to the middle section of the pair of support columns 16 that rotatably support the output disk 8.

In this conventional construction, by connecting the base-end section (left-end section in FIG. 18) of a hollow rotating shaft 41 with the output disk 8 with a spline engagement, and inserting the hollow rotating shaft 41 through one of the input disks 7b of the pair of input disks 7a, 7b so as to be able to rotate freely, it is possible to obtain the rotating force of the output disk 8. On the other hand, as illustrated in FIG. 22, it is also possible to integrally form an output gear 42 around the outer-circumferential edge section of the output disk 8a, and to obtain the rotation of the output disk 8a by way of the output gear 42. In the example illustrated in FIG. 22, the output gear 42 is a helical gear for the purpose of reducing vibration and noise that occurs when transmitting power. Therefore, when transmitting power, a force in the axial direction (thrust force) is applied to the output disk 8a, and this force in the axial direction is applied to the pair of support columns 16 by way of ball bearings 10 (see FIG. 18 and FIG. 19) that rotatably support both end sections in the axial direction of the output disk 8a.

In this way, making the support rigidity in the axial direction of the pair of support columns 16 high is desirable, and as a method for doing so, increasing the shaft diameter of the bolts for supporting the bottom end sections of the support columns 16 with respect to the actuator body 14, and increasing the shaft diameter of the bolts 27 for supporting the top end sections of the support columns 16 with respect to the connecting plate 15 is feasible. However, when the shaft diameters of the bolts 19, 27 are increased, there is a possibility that the size and weight of the continuously variable transmission apparatus will be increased, and that the head sections of these bolts 19, 27 will protrude from the bottom surface of the actuator body 14 or from the top surface of the connecting plate 15.

Even in a state in which the rod sections 20, 28 of the bolts 19, 27 are screwed into screw holes 25, 30 and further tightened, minute gaps exist between the male-screw sections that are formed around the outer-circumferential surfaces of the rod sections 20, 28 and the female-screw sections that are formed around the inner-circumferential surfaces of the screw holes 25, 30. The screw holes 25, 30 are provided in the radial direction of the input disks 7a, 7b and output disk 8, which is a direction orthogonal to the axial direction. Therefore, when a force is applied in the axial direction to the support columns 16, there is a possibility, even though small, for the support columns 16 to rotate (to become loose) around the center axes thereof due to the existence of the minute gaps. When the support columns 16 become loose, the parallelism between the pair of race rings of the ball bearings 10 that are provided between both end sections in the axial direction of the support columns 16 and output disk 8 is impaired. Therefore, edge load is applied to the rolling contact areas between the race surfaces of the ball bearings 10 and the rolling bodies, and there is a possibility that durability of the ball bearings 10 and the toroidal continuously variable transmission unit 1 will decrease. In order to prevent this kind of rotation of the support columns 16, together with supporting and connecting the pair of support columns 16 to the actuator body 14 and connecting plate 15 by the bolts 19, 27, spanning rotation-prevention pins between the support columns 16 and the actuator body 14 and connecting plate 15, or forming a flat surface section that comes in contact with these is feasible. However, in that case, the manufacturing cost of the continuously variable transmission apparatus increases.

RELATED LITERATURE

Patent Literature

[Patent Literature 1] JP 2004-084712 (A)

SUMMARY OF INVENTION

Taking the situation described above into consideration, the object of the present invention is to achieve construction of a toroidal continuously variable transmission for which the durability can be maintained, while at the same time can be made compact and lightweight.

The toroidal continuously variable transmission of the present invention includes: a casing, a rotating shaft, a pair of outside disks, an inside disk, plural support members, a pair of support plates, the same number of power rollers as the number of the support members, plural actuators, an actuator body, and a pair of support columns.

The rotating shaft is rotatably supported inside the casing. The pair of outside disks are supported by both end sections of the rotating shaft in the state that one side surfaces in the axial direction thereof respectively having an arc shaped cross section face each other, so as to rotate in synchronization with the rotating shaft. The inside disk is supported around the middle section of the rotating shaft so that both side surfaces in the axial direction thereof respectively having an arc shaped cross section face the one side surfaces in the axial direction of the pair of outside disks, and so as to be able to rotate freely with respect to the rotating shaft. The inside disk can be formed so as to be a single integrated body, or can be formed by joining together a pair of elements.

The support members include rolling shafts that are provided on both end sections in skewed positions with respect to the rotating shaft, with plural support members being provided in the axial direction between the both side surfaces in the axial direction of the inside disk and the one side surfaces in the axial direction of the pair of outside disks so as to be able to oscillating move around the center axes of the rolling shafts. The pair of support plates supports the rolling shafts. The power rollers are rotatably supported by the support members, and so that the circumferential surfaces thereof, which are spherical convex surfaces, come in contact with the both side surfaces in the axial direction of the inside disk and the one side surfaces in the axial direction of the pair of outside disks. The actuators cause the support members to displace in the axial direction of the rolling shafts. The actuator body houses the main-unit sections of the actuators.

The pair of support columns respectively include: a support-ring section having a circular through hole through which the rotating shaft is inserted, and supporting the end sections in the axial direction of the inside disk, and a pair of support-post sections concentrically provided in portions on both sides in the radial direction of the through hole of the support-ring section, and supporting the pair of support plates; and the support columns are arranged between the both side surfaces in the axial direction of the inside disk and the one side surfaces in the axial direction of the outside disks in the state that the rotating shaft is inserted through the through holes in the support-ring sections. One end sections of the pair of support columns are supported with respect to the actuator body by installation members that are arranged in the axial direction of the pair of outside disks and the inside disk, and the other end sections are supported with respect to the casing or a member that is fastened to the casing by installation members that are arranged in the axial direction of the pair of outside disks and the inside disk. In other words, the one end section of each of the pair of support columns is supported with respect to the actuator body by an installation member that exerts an axial force in the axial direction of the pair of outside disks and the inside disk, and the other end section of each of the pair of support columns is supported with respect to the casing or a member that is fastened to the casing by an installation member that exerts an axial force in the axial direction of the pair of outside disks and the inside disk.

When embodying the toroidal continuously variable transmission of the present invention, the pair of outside disks can be a pair of input disks, and the inside disk can be a single integrated output disk. In this case, preferably the rotation of the output disk can be obtained by directly forming an output gear such as a helical gear around the outer-circumferential edge portion of the output disk.

When embodying the toroidal continuously variable transmission of the present invention, preferably, installation-plate sections are provided in portions of both end sections of the pair of support columns that are further outward in the radial direction than the outer circumferential edges of the pair of outside disks and the inside disk and that protrude from the support plates. Moreover, anchor sections are provided in portions of the actuator body and casing, or member that is fastened to the casing, that face the installation-plate sections in the axial direction in the assembled state (in the state that the toroidal continuously variable transmission is arranged in the installation position inside the casing). The installation plate sections are joined to the anchor sections by the installation members.

More specifically, in this case, the installation members are bolts. Through holes are provided in the installation-plate sections, and screw holes are provided in the anchor sections. The installation-plate sections are joined to the anchor sections by screwing the bolts that are inserted through the through holes into the screw holes and further tightening.

Alternatively, of the installation members, the installation members for supporting one support column of the pair of support columns are bolts. First through holes are provided in the installation-plate sections of the one support column, and screw holes are provided in the anchor sections that are provided in portions that face the installation-plate sections of the one support column in the axial direction. The installation-plate sections of the one support column are joined to the anchor sections by screwing the bolts that have been inserted through the first through holes into the screw holes and further tightening. Moreover, of the installation members, the installation members for supporting the other support column of the pair of support columns are pins. Second through holes are provided in the installation-plate sections of the other support column, and installation holes are provided in the anchor sections that are provided in portions that face the installation plate sections of the other support column in the axial direction. The installation-plate sections of the other support column are joined to the anchor sections by inserting the pins that have been inserted through the second through holes into the installation holes.

The continuously variable transmission of the present invention includes a toroidal continuously variable transmission, and a differential-gear unit that is formed by a combination of plural gears. The differential-gear unit includes: a first input unit that is rotated and driven by the rotating shaft together with the pair of outside disks of the toroidal continuously variable transmission; and a second input unit that is connected to the inside disk; and rotation is obtained and transmitted to the output shaft according to the speed difference between the first input unit and the second input unit. Particularly, in the toroidal continuously variable transmission apparatus of the present invention, the toroidal continuously variable transmission is the toroidal continuously variable transmission of the present invention.

With the toroidal continuously variable transmission and continuously variable transmission apparatus of the present invention, it is possible to maintain the durability while at the same time making the toroidal continuously variable transmission and continuously variable transmission apparatus more compact and lightweight. In other words, a pair of support columns are supported with resect to an actuator body and casing or member that is fastened to the casing by installation members that are arranged in the axial direction. Therefore, looseness of the support columns around the center axes of the support columns due to forces in the axial direction that are applied to the support columns from the inside disk is prevented, so the durability of bearings that support the inside disk so as to rotate freely, and furthermore, the durability of the toroidal continuously variable transmission and the overall continuously variable transmission apparatus can be maintained. Moreover, construction for maintaining this durability can be achieved without making the installation members large, and without providing rotation-prevention pins, so it is possible to make the toroidal continuously variable transmission and continuously variable transmission apparatus more compact and lightweight.

DETAILED DESCRIPTION OF THE PREFERRED EMBODIMENTS

Figure 1:
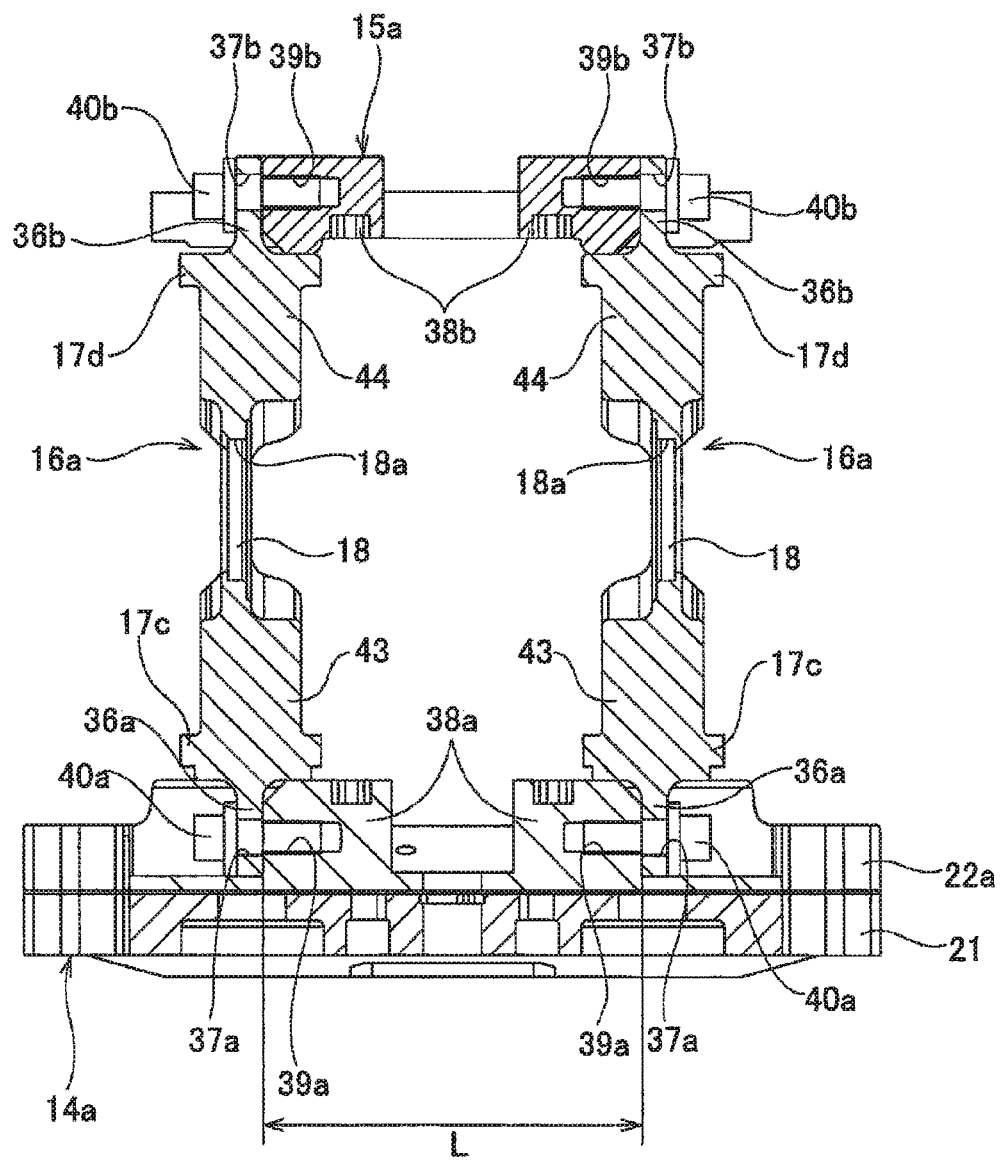
FIG. 1 is a cross-sectional view of a first example of an embodiment of the present invention.
Figure 2:
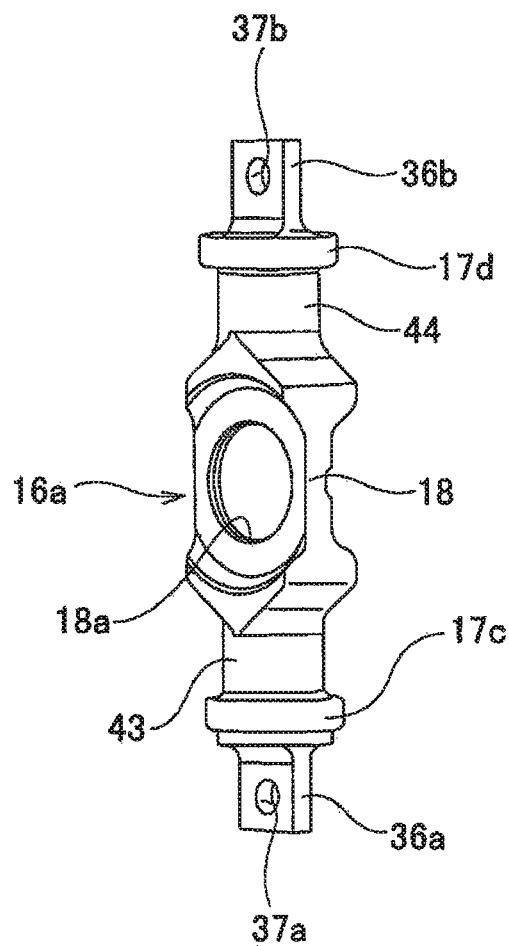
FIG. 2 is a perspective view illustrating a support column that has been taken from the first example.

FIG. 1 and FIG. 2 illustrate a first example of an embodiment of the present invention. The toroidal continuously variable transmission of this example is similar to the toroidal continuously variable transmission unit 1 of the continuously variable transmission apparatus having conventional construction illustrated in FIG. 18 to FIG. 21, and includes: a casing 13; an input shaft 5, which is a rotating shaft; a pair of input disks 7a, 7b, which are outside disks; an output disk 8, which is an inside disk; plural trunnions 11, which are support members; a pair of support plates 12a, 12b; the same number of power rollers 9 as the number of trunnions 11; plural actuators (not illustrated in the figures); an actuator body 14a; and a pair of support columns 16a.

The input shaft 5 is rotatably supported inside the casing 13. The pair of input disks 7a, 7b are supported by both end sections of the input shaft 5 in the state that one side surfaces in the axial direction thereof respectively having an arc-shaped cross section face each other, so as to rotate in synchronization with the input shaft 5. The output disk 8 is supported around the middle section of the input shaft 5 so that both side surfaces in the axial direction thereof respectively having an arc-shaped cross section face the one side surfaces in the axial direction of the pair of input disks 7a, 7b, and so as to be able to rotate freely with respect to the input shaft 5.

The trunnions 11 include rolling shafts 11a that are provided on both end sections of the trunnions 11 and that are in skewed positions with respect to the input shaft 5, and plural trunnions 11 are provided in the axial direction between both side surfaces in the axial direction of the output disk 8 and the one side surfaces in the axial direction of the pair of input disks 7a, 7b so as to be able to oscillatingly move centered around the rolling shafts 11a. The pair of support plates 12a, 12b, which support the rolling shafts 11a, are supported on the inside of the casing 13 by way of the actuator body 14a and connecting plate 15a and the pair of support columns 16a. The power rollers 9 are rotatably supported by the inside surfaces of the trunnions 11, such that the spherical convex circumferential surfaces thereof are made to come in contact with both side surfaces in the axial direction of the output disk 8 and the one side surfaces in the axial direction of the pair of input disks 7a, 7b. The actuators cause the trunnions 11 to displace in the axial direction of the rolling shafts 11a. The actuator body 14a stores the main-unit sections of the actuators. The power rollers 9 transmit power from the input disks 7a, 7b to the output disk 8 by rotating together with the input disks 7a, 7b.

The pair of support columns 16a respectively include: a support-ring section 18 having a circular through hole 18a though which the input shaft 5 is inserted, and supporting the end section in the axial direction of the output shaft 8 so as to be able to rotate freely; and a pair of support-post sections 17c, 17d concentrically provided in portions on both sides in the radial direction of the through hole 18a of the support-ring section 18, and supporting the pair of support plates 12a, 12b. The pair of support columns 16a are arranged between both side surfaces in the axial direction of the output disk 8 and the one side surfaces in the axial direction of the pair of input disks 7a, 7b in a state that the input shaft 5 is inserted through the through holes 18a of the support-ring sections 18.

In this example, rectangular flat plate-shaped installation plate sections 36a are provided on the bottom surfaces of the bottom end sections 43 of the support column 16a where the support-post sections 17c on the bottom side of the pair of support-post sections 17c, 17d that support the support plates 12a, 12b are provided, and protrude downward from the bottom surfaces. Both side surfaces in the axial direction of the installation plate sections 36a, except for the continuous sections (R sections) that are continuous with the bottom surfaces of the bottom end sections 43, are parallel with each other and form flat planes that are orthogonal to the axial direction of the input disks 7a, 7b and output disk 8 (left-right direction in FIG. 1). Through holes 37a that penetrate in the axial direction through the installation plate sections 36a are provided in the center sections of the installation plate sections 36a. Moreover, installation plate sections 36b are provided on the top surfaces of the top-end sections 44 of the support column 16a where the support-post sections 17d on the top side of the pair of support-post sections 17c, 17d are provided, and protrude upward from the top surfaces. Both side surfaces in the axial direction of the installation plate sections 36b, except for the continuous sections (R sections) that are continuous with the top surfaces of the top end sections 44, are parallel with each other and form flat planes that are orthogonal to the axial direction of the input disks 7a, 7b and output disk 8 (left-right direction in FIG. 1). Through holes 37b that penetrate in the axial direction through the installation plate sections 36b are provided in the center sections of the installation plate sections 36b. In this example, the bottom end sections 43 that are formed by the bottom-side support-post sections 17c and the installation-plate sections 36a correspond to one end sections of the support columns 16a, and the top end sections 44 that are formed by the top-side support-post sections 17d and the installation-plate sections 36b correspond to the other end sections of the support columns 16a.

Anchor sections 38a that are thicker than the other portions of the main body 22a, are integrally provided in portions of the main body 22a of the actuator body 14a that faces the bottom-side installation plate sections 36a in the state that the toroidal continuously variable transmission unit 1 is arranged in the installation position (assembled position) inside the casing 13. The outside surfaces of the anchor sections 38a, which are the side surfaces of both sides in the axial direction (opposite sides from each other), are flat surfaces that are orthogonal to the axial direction, or in other words, are flat surfaces that are parallel with both side surfaces of the bottom-side installation plate sections 36a. Screw holes 39a are formed in the axial direction in portions of the anchor sections 38a, that are aligned with the through holes 37a in the state that the toroidal continuously variable transmission unit 1 is arranged in the installation position inside the casing 13 and the outside surfaces of the anchor sections 38a come in contact with the inside surfaces that are the side surfaces of both side surfaces of the pair of bottom-side installation plate sections 36a that face the outside surfaces of the anchor sections 38a. Moreover, anchor sections 38b that are thicker than the other portions of the connecting plate 15a, are integrally provided in portions of the connecting plate 15a that face the top-side installation-plate sections 36b in axial direction. The outside surfaces of the anchor sections 38b, which are the side surfaces of both sides in the axial direction (opposite sides from each other), are flat surfaces that are orthogonal to the axial direction, or in other words, are flat surfaces that are parallel with both side surfaces of the top-side installation plate sections 36b. Screw holes 39b are formed in the axial direction in portions of the anchor sections 38b, that are aligned with the through holes 37b in the state that the toroidal continuously variable transmission unit 1 is arranged in the installation position inside the casing 13 and the outside surface of the anchors sections 38b come in contact with the inside surfaces that are the side surfaces of both side surfaces of the pair of top-side installation plate sections 36b that face the outside surfaces of the anchor sections 38b.

In the state that the toroidal continuously variable transmission unit 1 is arranged in the installation position inside the casing 13, the inside surfaces of the installation plate sections 36a, 36b and the outside surfaces of the anchor sections 38a, 38b come in contact with each other, and bolts 40a, 40b, which are installation members, and that are arranged in the axial direction of the pair of input disks 7a, 7b and output disk 8 and inserted through the through holes 37a, 37b of the installation plate sections 36a, 36b are screwed into screw holes 39a, 39b in the anchor sections 38a, 38b. As a result, the installation plate sections 36a, 36b of the support columns 16a are firmly held between the inside surfaces in the axial direction of the head sections of the bolts 40a, 40b and the outside surfaces in the axial direction of the anchor sections 38a, 38b, and the axial forces exerted by the bolts 39a, 39b in the axial direction of the pair of input disks 7a, 7b and the output disk 8 join and fasten the bottom end sections 43 of the support columns 16a to the actuator body 14a, and join and fasten the top end sections 44 of the support columns 16a to the connecting plate 15a.

In this example, it is possible to make the toroidal continuously variable transmission and continuously variable transmission apparatus more compact and lightweight, while at the same time maintain the durability thereof. In other words, the pair of support columns 16a are supported with respect to the actuator body 14a and connecting plate 15a by inserting bolts 40a, 40b for supporting the support columns 16a through through holes 37a, 37b that are provided in the axial direction, and screwing the bolts 40a, 40b into the screw holes 39a, 39b. In other words, the pair of support columns 16a are supported with respect to the actuator body 14a and the connecting plate 15a by the bolts 40a, 40b that exert forces in the axial direction of the input disks 7a, 7b and the output disk 8. With this kind of construction, in this example, the support rigidity against forces in the axial direction that are applied to the support columns 16a from the output disk 8 is increased. Therefore, when compared to the case in which the pair of support columns 16 are supported by bolts 19, 27 in a direction that is orthogonal to the axial direction as in the conventional construction illustrated in FIG. 18 to FIG. 21 (exert axial forces in the radial direction), it is possible to keep the shaft diameters and size of the heads of the bolts 40a, 40b small, so it is possible to make the continuously variable transmission apparatus compact and lightweight.

The pair of support columns 16a are supported by firmly holding the both side surfaces of the installation plate sections 36a, 36b that are orthogonal to the axial direction between the inside surfaces in the axial direction of the heads of the bolts 40a, 40b and the outside surfaces in the axial direction of the anchor sections 38a, 38b. Therefore, the support columns 16a are prevented from becoming loose about the center axes of the support columns 16a due a force in the axial direction that is applied from the output disk 8, so it is possible to maintain the durability of the ball bearings 10 that support both end sections in the axial direction of the output disk 8 so as to be able to rotate freely, and the durability of the continuously variable transmission apparatus. Furthermore, there is no need for providing rotation-prevention pins or flat surfaces between the support columns 16a and the actuator body 14a and connecting plate 15a in order to prevent looseness of the support columns 16a, so it is possible to prevent the manufacturing cost of the continuously variable transmission apparatus from increasing unnecessarily.

The present invention is not limited to a half toroidal continuously variable transmission, and can also be applied to a full toroidal continuously variable transmission, and a continuously variable transmission apparatus that is a combination of a toroidal continuously variable transmission and a planetary-gear transmission. Moreover, the output disk, which is an inside disk, is not limited to integrated construction, and it is possible to employ separated construction in which a pair of output-disk elements are fitted with both end sections of a cylindrical sleeve with a spline fit, and to make these output-disk elements rotate in synchronization with each other. When employing this kind of separated output disk, it is possible to obtain the rotation of these output-disk elements by providing an output gear between the pair of output-disk elements that rotates in synchronization with the cylindrical sleeve.

Moreover, instead of bolts, it is also possible to use studs or rivets as the installation members for joining and fastening the installation plate sections 36a, 36b of the pair of support columns 16a to the actuator body 14a and connecting plate 15a.

Figure 3:
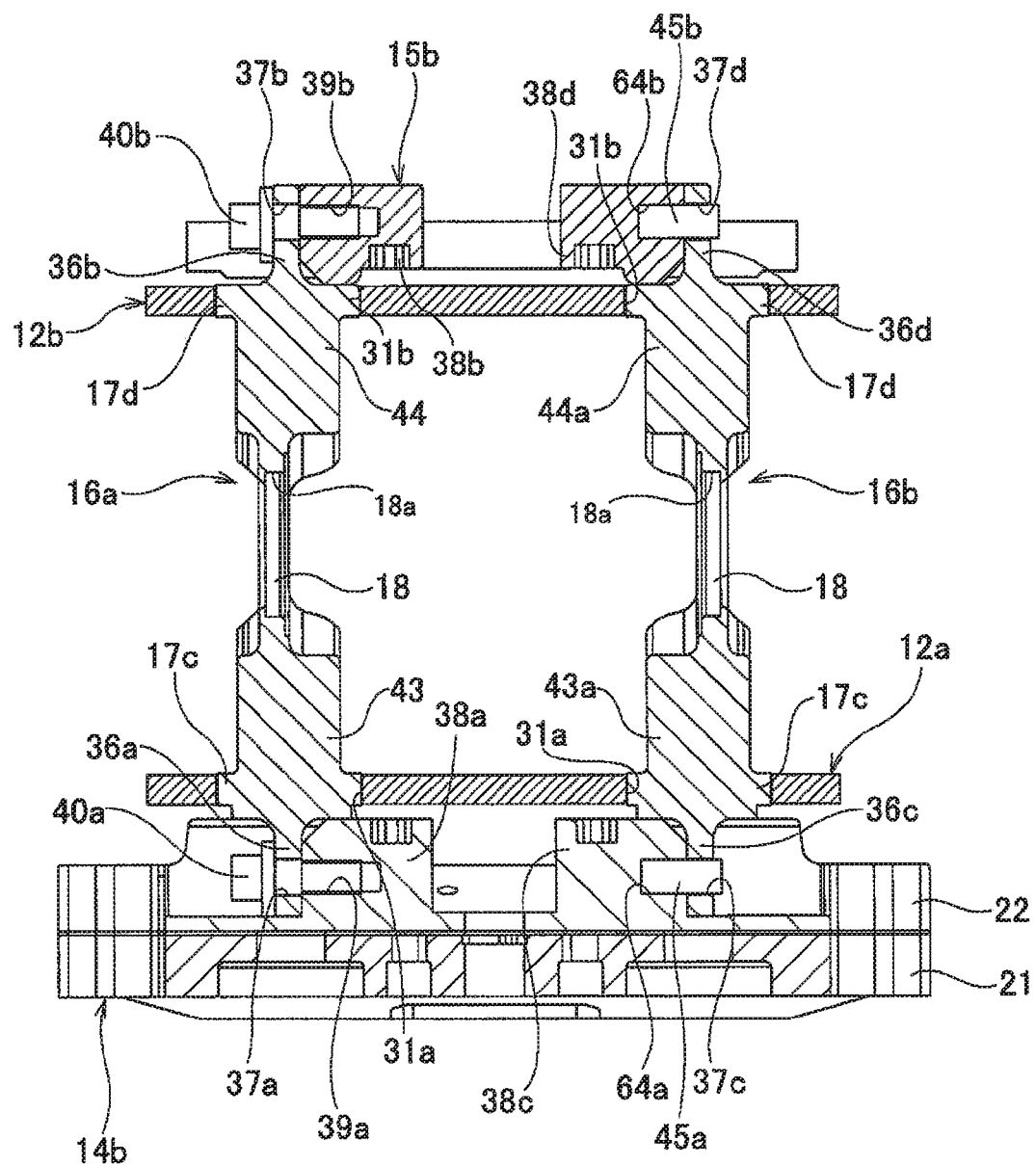
FIG. 3 is a cross-sectional view of a second example of an embodiment of the present invention.
Figure 4:
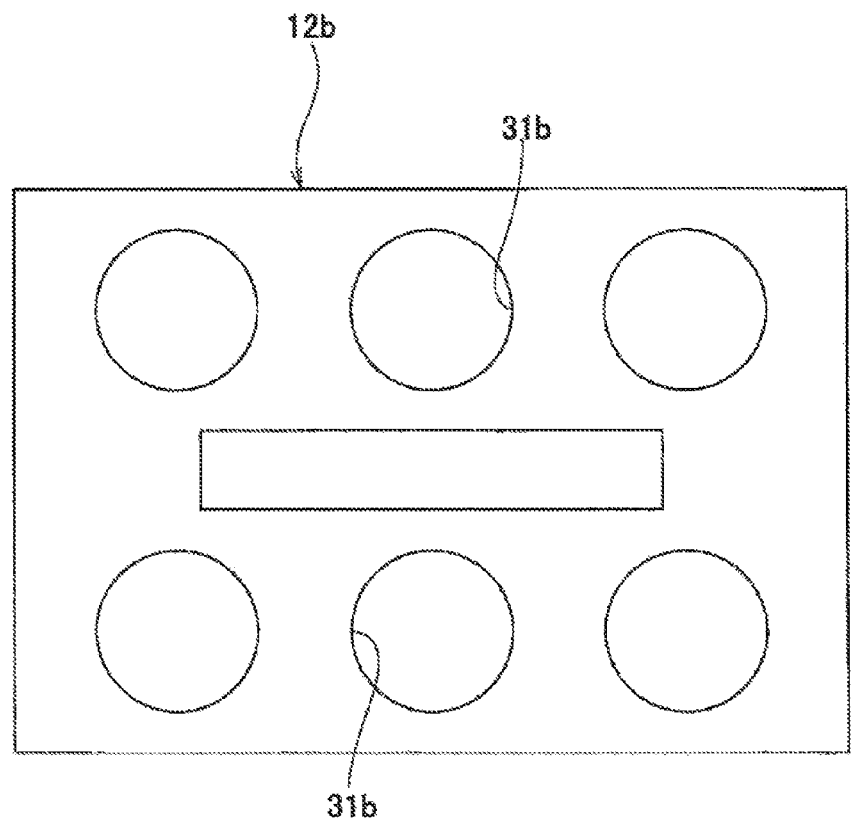
FIG. 4 is a top view illustrating a support plate that has been taken from the second example.

FIG. 3 and FIG. 4 illustrate a second example of an embodiment of the present invention. In the case of the toroidal continuously variable transmission of this example, one support column 16a of the pair of support columns 16a, 16b (left support column in FIG. 3) is similar to that of the first example of an embodiment in that the bottom end section 43 of the support column 16a is joined and fastened to the actuator body 14b by a bolt 40a that exerts an axial force in the axial direction, and the top end section 44 of the support column 16a is joined and fastened to the connecting plate 15b by a bolt 40b that exerts an axial force in the axial direction. However, the other support column 16b of the pair of support columns 16a, 16b (right support column in FIG. 3) is such that the bottom end section 43a of the support column 16b is supported by the actuator body 14b by a circular column-shaped pin 45a, and the top end section 44a of the support column 16b is supported by the connecting plate 15b by a circular column-shaped pin 45b. In other words, through holes 37c, 37d are provided in the center sections of installation-plate sections 36c, 36d that are provided on the end surfaces of the bottom end section 43a and the top end section 44a of the other support column 16b so as to protrude from these end surfaces, and these through holes 37c, 37d penetrate in the axial direction through the installation-plate sections 36c, 36d, and pins 45a, 45b that are inserted through the through holes 37c, 37d (fitted inside with no looseness) are press-fitted into installation holes 64a, 64b that are formed in anchor sections 38c, 38d that are provided in portions that face the installation-plate sections 36c, 36d in the axial direction, with an interference fit. As a result, the other support column 16b is prevented from rotating (being loose) around the center axis of the other support column 16b, however, the bottom end section 43a and the top end section 44a of the other support column 16b are able to displace in the axial direction of the output disk 8, and the other support column 16b is supported by the actuator body 14b and connecting plate 15b.

When assembling the toroidal continuously variable transmission of this example, first, a support hole 31a that is formed in the bottom-side support plate 12a of the pair of support plates 12a, 12b is fitted with no looseness around the outside of the bottom-side support-post section 17c of the support-post sections 17c, 17d of the pair of support columns 16a, 16b, and a support hole 31b that is formed in the top-side support plate 12b is fitted with no looseness around the outside of the top-side support-post section 17d. Next, the inside surfaces of the installation-plate sections 36a, 36b that are provided in the one support column 16a are brought into contact with the outside surfaces of the anchor sections 38a, 38b that are provided in portions that face these installation-plate sections 36a, 36b in the axial direction. Bolts 40a, 40b that are inserted through the through holes 37a, 37b in the installation-plate sections 36a, 36b are screwed into screw holes 39a, 39b of the anchor sections 38a, 38b and further tightened so that the one support column 16a is fastened to and supported by the actuator body 14b and connecting plate 15b. Then, in the state that the inside surfaces of the installation-plate sections 36c, 36d of the other support column 16b are made to come in contact with or closely face the outside surfaces of the anchor sections 38c, 38d and the through holes 37c, 37d are aligned with the installation holes 64a, 64b, pins 45a, 45b are inserted through the through holes 37c, 37d and into the installation holes 64a, 64b from the outside (right side in FIG. 3) of the installation-plate sections 36c, 36d (inserted through the through holes 37c, 37d and press-fitted into the installation holes 64a, 64b).

With the toroidal continuously variable transmission of this example, the one support column 16a of the pair of support columns 16a, 16b is fastened to and supported by the actuator body 14b and connecting plate 15b by bolts 40a, 40b that are arranged in the axial direction of the output disk 8, and the other support column 16b is supported by the actuator body 14b and connecting plate 15b by pins 45a, 45b that are arranged in the axial direction of the output disk 8 so as to be able to displace in the axial direction of the output disk 8. Therefore, both of the pair of support columns 16a, 16b are prevented from rotating (being loose) around the center axes of the support columns 16a, 16b.

Particularly, in this example, the other support column 16b is supported with respect to the actuator body 14b and connecting plate 15b by pins 45a, 45b so as to be able to displace in the axial direction of the output disk 8. Therefore, even when the precision of the shape of the anchor sections 38a, 38b that are provided on the actuator body 14 and connecting plate 15a is not sufficient and the distance L (refer to FIG. 1) between the outside surfaces of the anchor section 38a (38b) is longer or shorter than the design value, interference between the outer-circumferential surfaces of the support-post sections 17c, 17d of the support columns 16a, 16b and the inner-circumferential surfaces of the support holes 31a, 31b in the support plates 12a, 12b and the surface pressure thereof becoming excessively high is prevented. As a result, regardless of precision of the shape of the anchor sections 38a, 38b, oscillation of the pair of support plates 12a, 12b, and displacement in the axial direction of the center axes of the support columns 16a, 16b can be performed smoothly, so it is possible to keep down the manufacturing cost of the toroidal continuously variable transmission.

In this example, it is possible to increase the support rigidity against a force in the axial direction that is applied to the one support column 16a from the output disk 8, however it is not possible to increase the support rigidity against a force in the axial direction that is applied to the other support column 16b from the output disk 8. In this example, the force in the axial direction that is applied to the other support column 16b is supported by the support plates 12a, 12b by way of the areas of contact between the outer-circumferential surfaces of the support-post sections 17c, 17d and the inner-circumferential surfaces of the support holes 31a, 31b in the support plates 12a, 12b. Therefore, when the force in the axial direction that is applied to the other support column 16b is comparatively small (smaller than the force in the axial direction that is applied to the one support column 16a), no particular problem occurs. The size and direction of the forces in the axial direction that are applied to the pair of support columns 16a, 16b change due to the operating conditions of the toroidal continuously variable transmission, such as the size and direction of the torque being transmitted. Therefore, which of the pair of support columns 16a, 16b is to be supported with respect to the actuator body and connecting plate by bolts or pins is determined according to the operating conditions of the toroidal continuously variable transmission.

Figure 5:
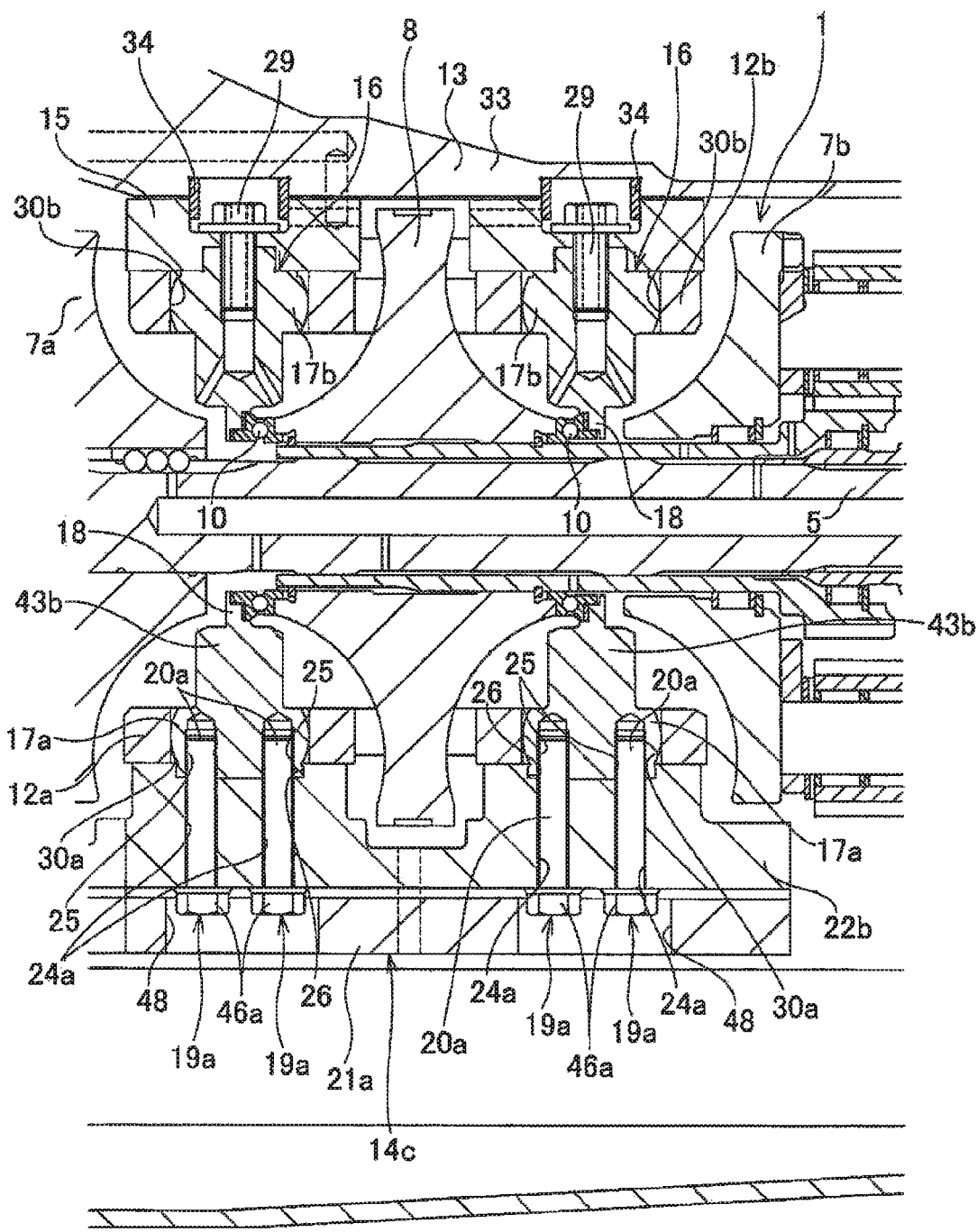
FIG. 5 is an enlarged cross-sectional view of the main parts of a first reference example that is related to the present invention.
Figure 6:
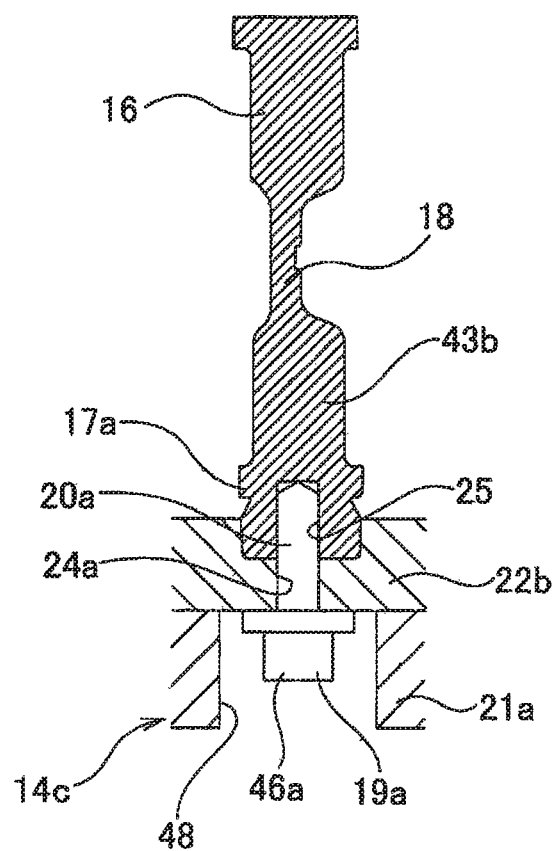
FIG. 6 is a schematic view illustrating the construction of the first reference example for supporting the bottom end section of a support column.
Figure 7A:
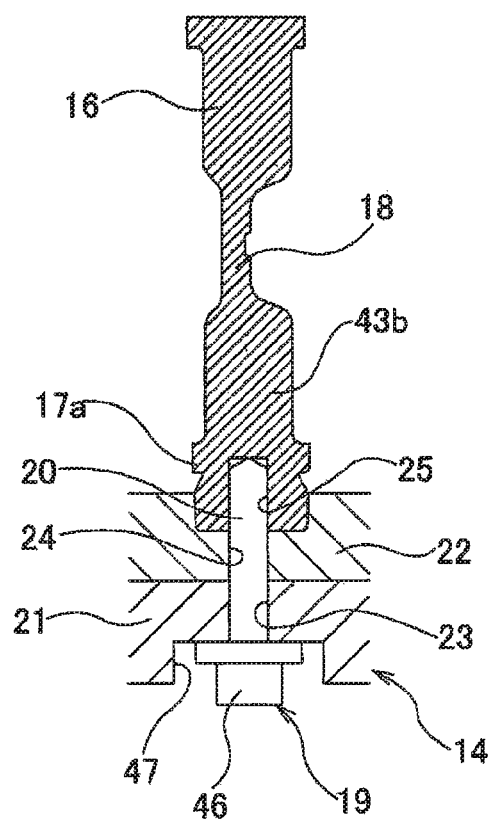
FIG. 7A is a schematic view illustrating construction for supporting the bottom end section of a support column in conventional construction, and is for comparison of the first reference example and conventional construction.
Figure 7B:
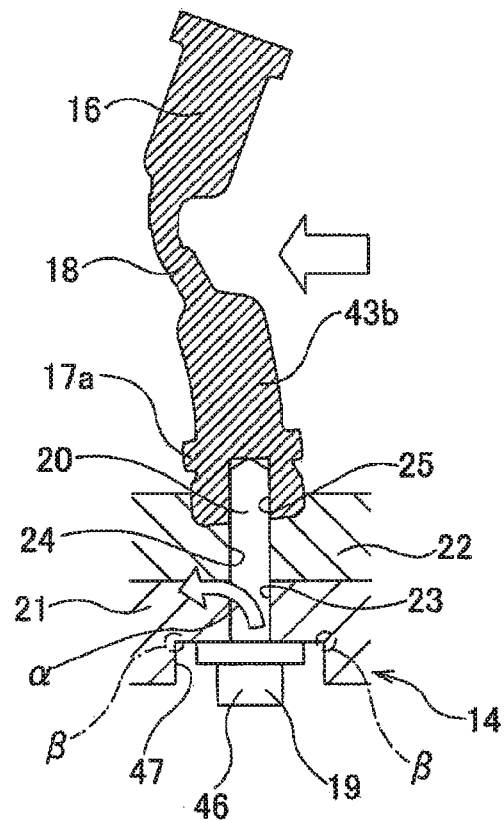
FIG. 7B is a schematic view illustrating that construction when a force in the axial direction is applied.

FIG. 5 and FIG. 6 illustrate a first reference example related to the present invention. In this reference example, the occurrence of damage such as cracking of the actuator body 14c to which the bottom end sections 43b of the support columns 16 are joined and fastened is prevented regardless of the forces in the axial direction that are applied to the pair of support columns 16. In other words, in the conventional construction that is illustrated in FIG. 18 to FIG. 21, friction loss occurs inside the planetary-gear transmission 2 during operation of the continuously variable transmission, and when a force in the axial direction is applied to the middle section of a support column from the output disk 8, the middle section of the support column 16 bends in the axial direction and elastically deforms in a direction so as to become a V shape as exaggeratedly illustrated in FIG. 7B. In this case, the bottom end section 43b of the support column 16 is joined and fastened to the actuator body 14 by a bolt 19 in a direction that is orthogonal to the axial direction. The bolt 19 is such that by the inner surface of the head section 46 coming in contact with the bottom surface of a concave section 47 that is formed in the lid body 21 of the actuator body 14, the head section 46 is prevented from protruding from the bottom surface of the actuator body 14. Therefore, when a support column 16 elastically deforms in a direction so as to become a V shape due to a force in the axial direction that is applied to the middle section of the support column 16, a moment in the direction of bending is applied to the tip-end section of the bolt 19. Then a force (moment) is applied in a direction such that the inner surface of the head section of the bolt 19 presses the bottom-surface portion of the concave section 47 of part of the lid body 21 in a direction indicated by the arrow a in FIG. 7B. As a result, stress is concentrated in the corner section (portion indicated by β in FIG. 7B) that is the connecting section between the bottom surface and inner-circumferential surface of the concave section 47. The bottom surface portion of the concave section 47 that includes this corner section is thinner compared to the other portions, so it is easy for damage such as cracking to occur in this corner section.

In this reference example, the actuator body 14c is formed by joining and fastening a main body 22b and lid body 21a by bolts (not illustrated in the figure) with the bottom surface of the main body 22b coming in contact with the top surface of the lid body 21a. Moreover, with the rod section 20a of the bolt 19a being inserted through a through hole 24a that is formed in the main body 22b, and the tip-end section of the bolt 19a protruding from the top surface of the main body 22b, the tip-end section of the bolt 19a is screwed into a screw hole 25 that is opened on the bottom surface of the support column 16 and further tightened. With this kind of construction, the bottom end section 43b of the support column 16 is joined and fastened to the actuator body 14c. In this state, the inner surface (top surface) of the head section 46a of the bolt 19a comes in contact with the bottom surface of the main body 22b. Therefore, a through hole 48 is provided in the portion of the lid body 21a that is aligned with the head section 46a of the bolt 19a so that the bottom surface of the head section 46a of the bolt 19a does not protrude from the bottom surface of the lid body 21a.

In this reference example, occurrence of damage such as cracking of the actuator body 14c which the column sections 16 fastened to and supported by is prevented. In other words, the inner surface of the head section 46a of the bolt 19a that supports the bottom end section 43b of a column section 16 is a flat surface and comes in contact with the bottom surface of the main body 22b. Therefore, even when a force in the axial direction is applied to a column section 16, a phenomenon is not generated that a force is applied to the bottom surface portion of the concave section 47 that is formed in the lid body 21 from the head section of the bolt 19, and stress is concentrated in the corner section of the thin concave section 47. In this reference example, a force is applied to the main body 22b from the head section 46a of the bolt 19a, however, at least the portion of the main body 22a where the inner surface of the head section 46a comes in contact is flat and the thickness is not particularly small. Therefore, even when a force is applied from the head section 46a of a bolt 19a, it is difficult for large stress to occur in any of the portions of the main body 22b. As a result, the occurrence of damage such as cracking of the actuator body 14c is prevented regardless of the force in the axial direction being applied to the middle section of a column section 16 from the output disk 8.

Moreover, by providing through holes 48 in the portions of the lid body 21a of the actuator body 14c that are aligned with the head sections 46a of the bolts 19a, the bottom surfaces of the head sections 46a do not protrude from the bottom surface of the lid body 21a. Therefore, it is possible to make the actuator body 14c compact and lightweight.

Figure 8:
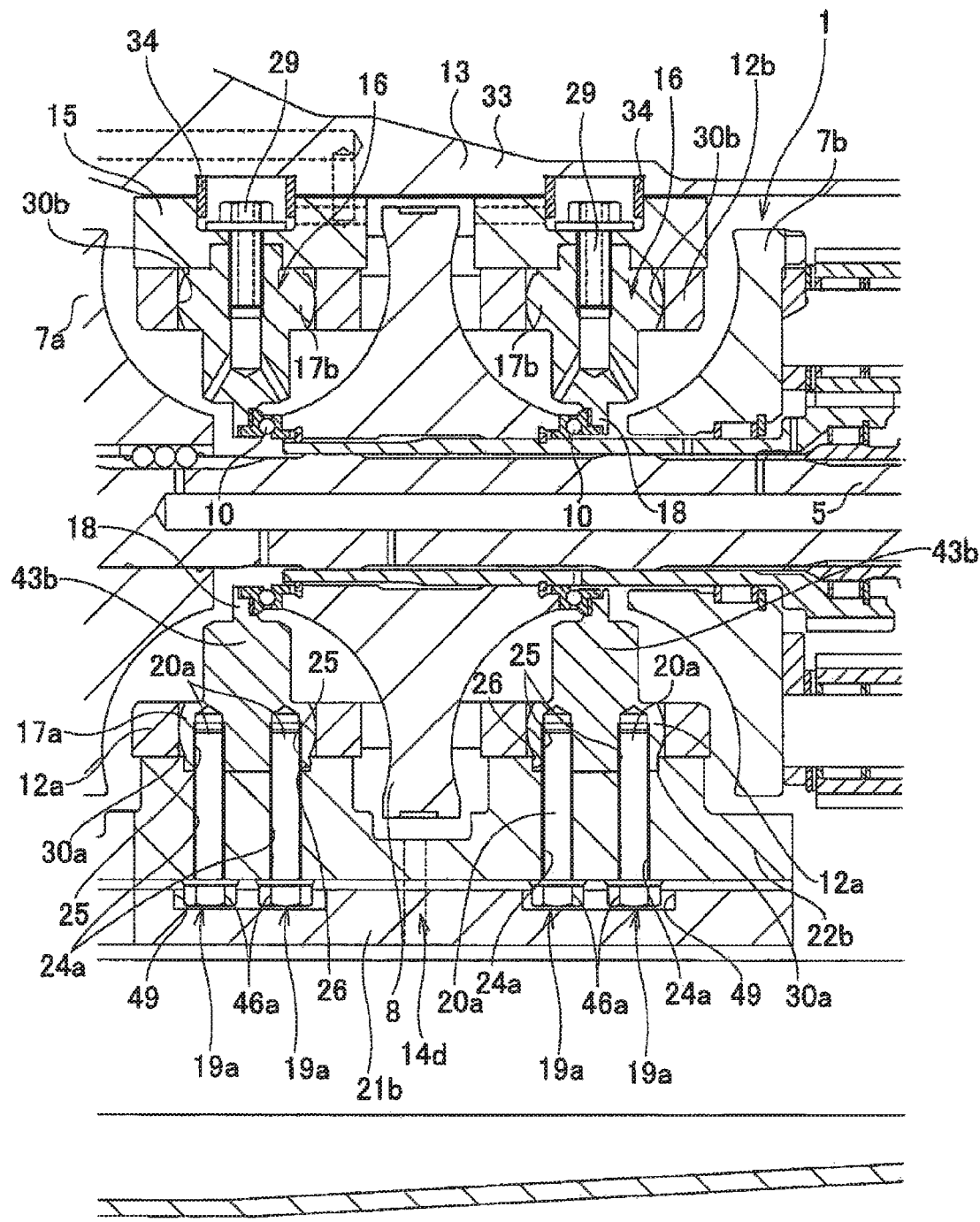
FIG. 8 is a drawing similar to FIG. 6 and illustrates a second reference example related to the present invention.
Figure 9A:
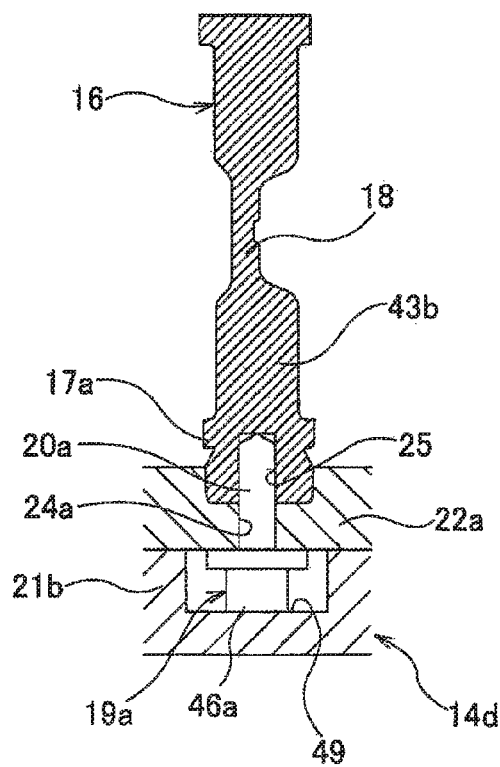
FIG. 9A is a schematic view similar to FIG. 7A of a second reference example.
Figure 9B:
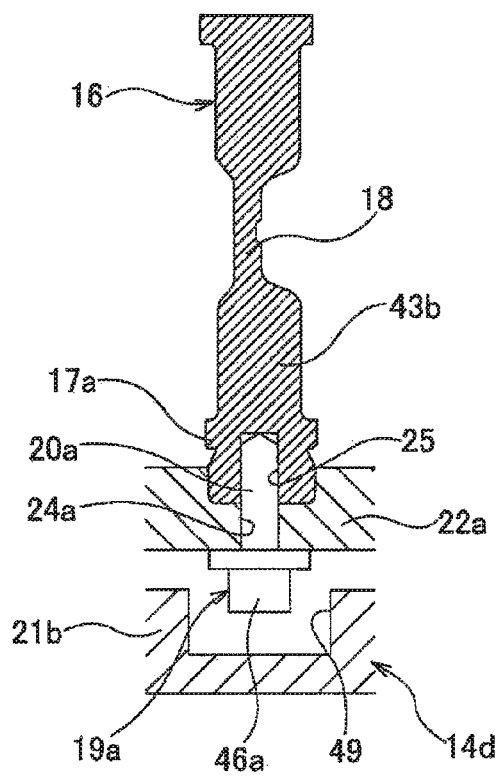
FIG. 9B is a schematic view illustrating the state before the lid body and the main body are combined.

FIG. 8 and FIG. 9 illustrate a second reference example related to the present invention. In this reference example, concave sections 49 are provided in the portions of the top surface of the lid body 21b of the actuator body 14d that are aligned with the head sections 46a of the bolts 19a. The outer surfaces of the head sections 46a come in contact with or closely face the bottom surfaces of the concave sections 49. As a result, it is possible to prevent the bolts 19a from becoming loose or dropping out of the through holes 24a that are formed in the main body 22b. The construction and function of the other portions are the same as in the first reference example.

Figure 10:
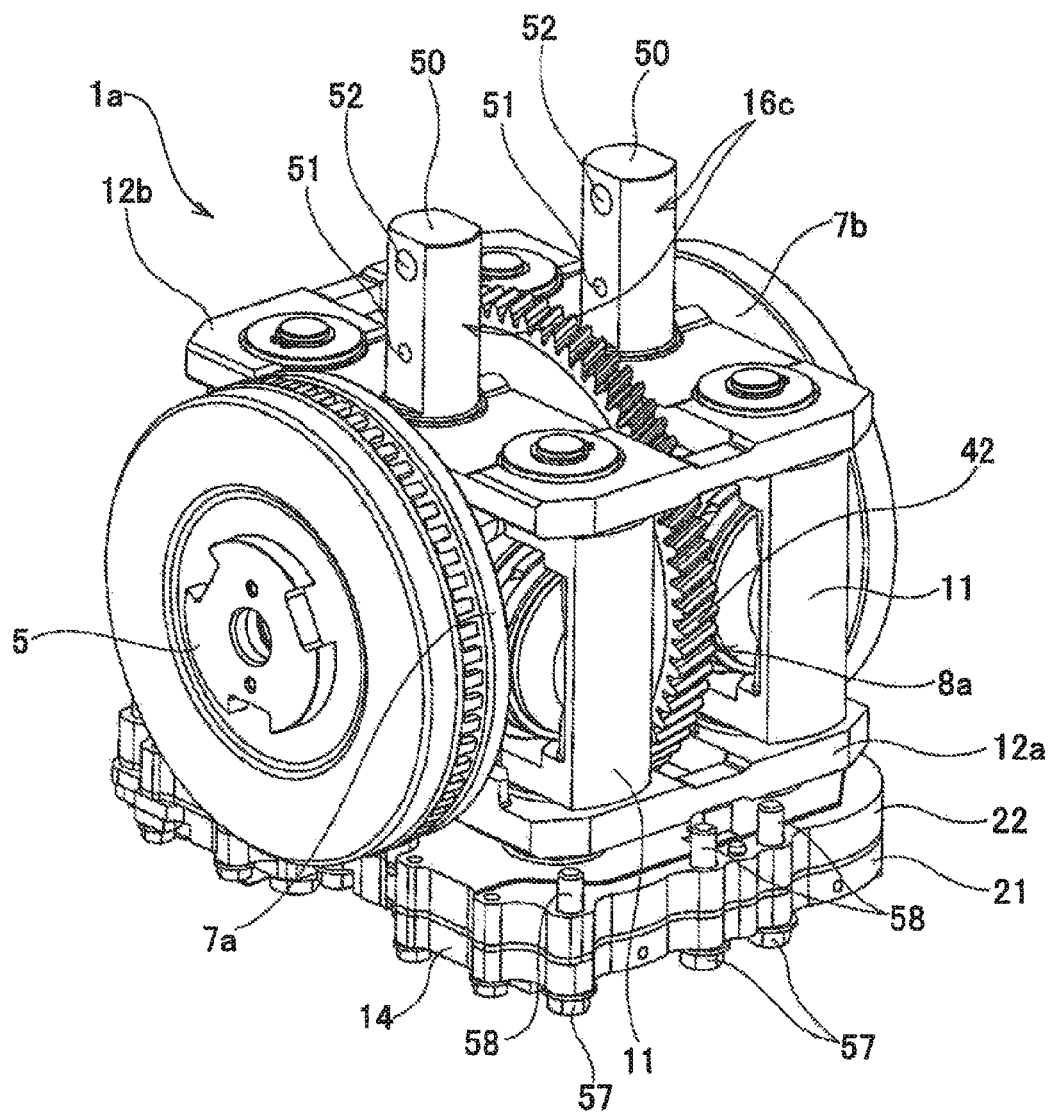
FIG. 10 is a perspective view of a third reference example related to the present invention, and illustrates a module after the main portions of the toroidal continuously variable transmission have been assembled, and before assembly in the casing.
Figure 11:
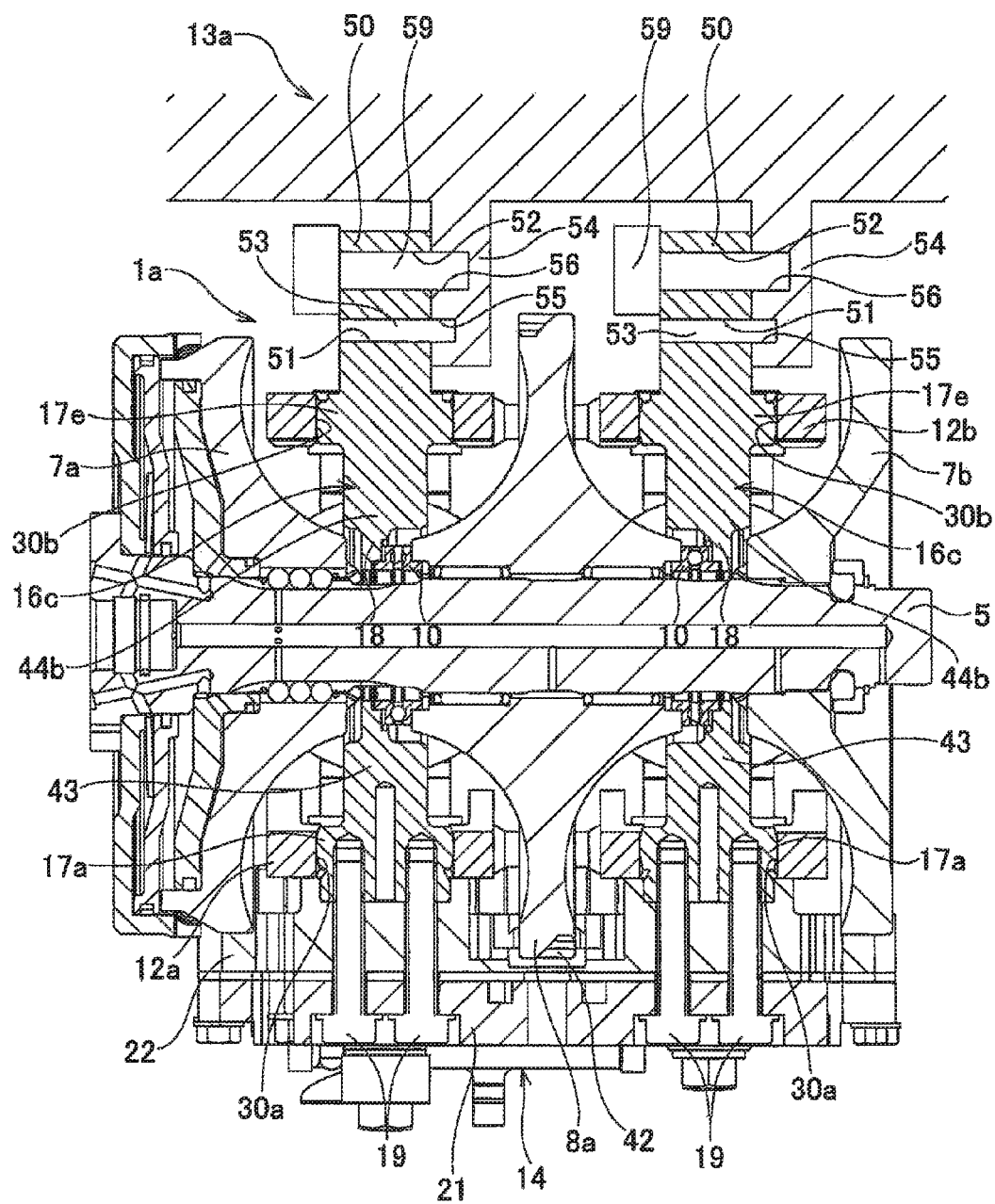
FIG. 11 is a cross-sectional view of a third reference example, and illustrates the installed state inside the casing.

FIG. 10 and FIG. 11 illustrate a third reference example related to the present invention. In this reference example, the width dimension of the casing 13a that houses the toroidal continuously variable transmission unit 1a, which is a toroidal continuously variable transmission, and the planetary-gear transmission is kept small, and the toroidal continuously variable transmission unit 1a can easily be fastened and supported inside the casing 13a, while being positioned in a specified position. In other words, in the case of the conventional construction illustrated in FIG. 18 to FIG. 21, fastening and supporting the toroidal continuously variable transmission unit 1 inside the casing 13 is performed by bringing the portions near both ends in the width direction of the actuator body 14 in contact with a stepped section 32 that is formed on the casing 13 side, and screwing bolts that have been inserted from the bottom through bolt-insertion holes 33 that have been formed in portions near both ends in the width direction of the actuator body 14 into screw holes that are opened in the stepped section 32 and further tightening. Here, increasing the width dimension of the actuator body 14 in order to provide the stepped section 32 in the casing 13 (maintain the width dimension of the stepped section 32) and to make it possible to bring the portions near both ends in the width direction of the actuator body 14 into contact with the stepped section 32 is disadvantageous from the aspect of making the overall continuously variable transmission apparatus, including the casing 13, compact and lightweight. However, decreasing the width dimension of the stepped section 32 and decreasing the width dimension of the actuator body 14 makes it difficult for the actuator body 14 to be fastened to and supported by the casing 13 by bolts.

In this reference example, the top end sections 44b of the pair of support columns 16c are directly joined and fastened to the inner surface of the casing 13a, and the connecting plate 15 is omitted. Therefore, the portions of the top end sections 44b of the support columns 16c that are located further above the top-side support-post sections 17e extend to portions that are further outward in the radial direction than the outer-circumferential edges of the input disks 7a, 7b and output disk 8, and that protrude further upward than the top-side support plates 12b, and installation sections 50 are provided in those portions. Pairs of upper and lower through holes 51, 52 are formed in the axial direction in the portions of the installation sections 50 that protrude further upward than the outer-circumferential edge of the input disks 7a, 7b and output disk 8a. Of the through holes 51, 52, the through holes 51 that are formed on the bottom side have a comparatively small diameter, positioning pins 53 are fitted in these trough holes 51 with an interference fit, and the tip-end sections (right-end sections in FIG. 11) of the positioning pins 53 protrude from the side surfaces of the installation sections 50. On the other hand, the bottom end sections 43 of the support columns 16c are joined and fastened to the top surface of the main body 22 of the actuator body 14 by bolts 19 that are arranged in the radial direction of the input disks 7a, 7b and output disk 8.

Moreover, anchor sections 54 that are integrated with the casing 13a are provided in portions of the inner surface of the casing 13 that are aligned with the installation sections 50 in the state that the toroidal continuously variable transmission unit 1a is arranged in the installation position inside the casing 13. Positioning holes 55 through which the positioning pins 53 can be inserted are provided in the axial direction in the bottom-side portions of the anchor sections 54, and screw holes 56 are provided in the axial direction in the top-side portions of the anchor sections 54. The positioning holes 55 and screw holes 56 are not limited to being holes with bottoms such as illustrated in the figures, and can be through holes.

Furthermore, of the plural bolts for joining and fastening the main body 22 and lid body 21 of the actuator body 14, the positioning pin sections 58 that are provided on the top end sections of the part of the bolts 57 that are arranged on both sides in the width direction and that have a smaller diameter than that of the male screw sections of the bolts 57 protrude from the top surface of the main body 22 of the actuator body 14. Second positioning holes through which the positioning pin sections 58 of the bolts 57 can be inserted without looseness are formed in part of the stepped section 32 that is formed on the inside surface of the casing 13.

In order to support and fasten the toroidal continuously variable transmission unit 1a inside the casing 13a, the toroidal continuously variable transmission unit 1a is inserted inside the casing from the opening on the bottom side. When doing this, the tip-end sections of the positioning pins 53 are either not allowed to protrude from the side surface of the installation sections 50, or the positioning-pin section 58 are not allowed to protrude from the top surface of the actuator body 14.

In the case of not allowing the positioning-pin sections 58 to protrude from the top surface of the actuator body 14, the position of the toroidal continuously variable transmission unit 1a in the axial direction of the input disks 7a, 7b and output disk 8 is moved just a little (an amount equal to or greater than the fitting amount between the positioning pins 53 and the positioning holes) to the left side in FIG. 11, and in this state the toroidal continuously variable transmission unit 1a is inserted inside the casing 13a, after which the toroidal continuously variable transmission unit 1a is moved to the right side in FIG. 11 to fit the positioning pins 53 into the positioning holes 55. Next, the bolts 59 that are inserted through the through holes 52 are screwed into the screw holes 56 in the anchor sections 54, and further tightened. The work of tightening the bolts 59 can be performed by using a tool such as a wrench that is inserted from the front-rear direction in FIG. 11. Moreover, by increasing the tightness of the bolts 57, the positioning-pin sections 58 are made to protrude from the top surface of the actuator body 14, and the positioning-pin sections 58 engage with the second positioning holes. The work of engaging the positioning-pin sections 58 with the second positioning holes is performed at least before tightening the bolts 59.

On the other hand, in the case of not allowing the tip-end sections of the positioning pins 53 to protrude from the side surfaces of the installation sections 50, the position of the toroidal continuously variable transmission unit 1a in the axial direction of the input disks 7a, 7b and output disk 8 is regulated to the proper position, and in this state, the toroidal continuously variable transmission unit 1a is inserted inside the casing 13a and the positioning-pin sections 58 are made to engage in the second positioning holes. Next, the bolts 59 that are inserted through the through holes 52 are screwed into the screw holes 56 in the anchor sections 54 and further tightened. Moreover, the tip-end sections of the positioning pins 53 are made to protrude from the side surfaces of the installation sections 50, and the tip-end sections of the positioning pins 53 are made to engage in the positioning holes 55. In this way, even when the tip-end sections of the positioning pins 53 are not allowed to protrude from the side surfaces of the installation sections 50 beforehand, the work of engaging the tip-end sections of the positioning pins 53 with the positioning holes 55 is performed at least before tightening the bolts 59.

In either case, in the assembled state, engagement between the positioning pins 53 and the positioning holes 55 make it possible to position the toroidal continuously variable transmission unit 1a in the up-down direction with respect to the casing 13a. Moreover, engagement between the positioning-pin sections 58 and the second positioning holes make it possible to position the toroidal continuously variable transmission unit 1a in the axial direction and width direction with respect to the casing 13a. Furthermore, by tightening the bolts 59, the toroidal continuously variable transmission unit 1a is prevented from becoming loose with respect to the casing 13a.

In the case of this reference example, it is possible to easily support and fasten the toroidal continuously variable transmission unit 1a inside the casing 13a in a specified position, while at the same time suppress an increase in the width dimension of the casing 13a. In other words, by joining the installation sections 50 that are provided on the top end sections 44b of the support columns 16c and the anchor sections 54 that are provided on the inner surface of the casing 13a with bolts 59, the toroidal continuously variable transmission unit 1a is supported and fastened inside the casing 13a. In the case of this reference example, it is sufficient to form second positioning holes in the stepped section that is formed on the inner surface of the casing 13a for engaging with the positioning-pin sections 58. The inner diameter of the second positioning holes can be less than the inner diameter of the screw holes that are formed in the conventional construction illustrated in FIG. 18 to FIG. 21, and large force is not applied to the portion of the second positioning holes, so the width dimension of the stepped section 32 can be narrow. Therefore, it is possible to firmly support and fasten the toroidal continuously variable transmission unit 1a inside the casing 13a without making the width dimension of the casing 13a particularly large. As a result, it is possible to make the continuously variable transmission and continuously variable transmission apparatus more compact and lightweight. Moreover, in the case of this reference example, it is possible to position the support columns 16c with respect to the casing 13a, so the output shaft 8a, both end sections of which are supported by the support columns 16c, the input shaft 5 that is supported on the inner-diameter side of the output disk 8, and the input disks 7a, 7b that are supported around both end sections of the input shaft 5 can be positioned with good precision with respect to the casing 13a.

Figure 12:
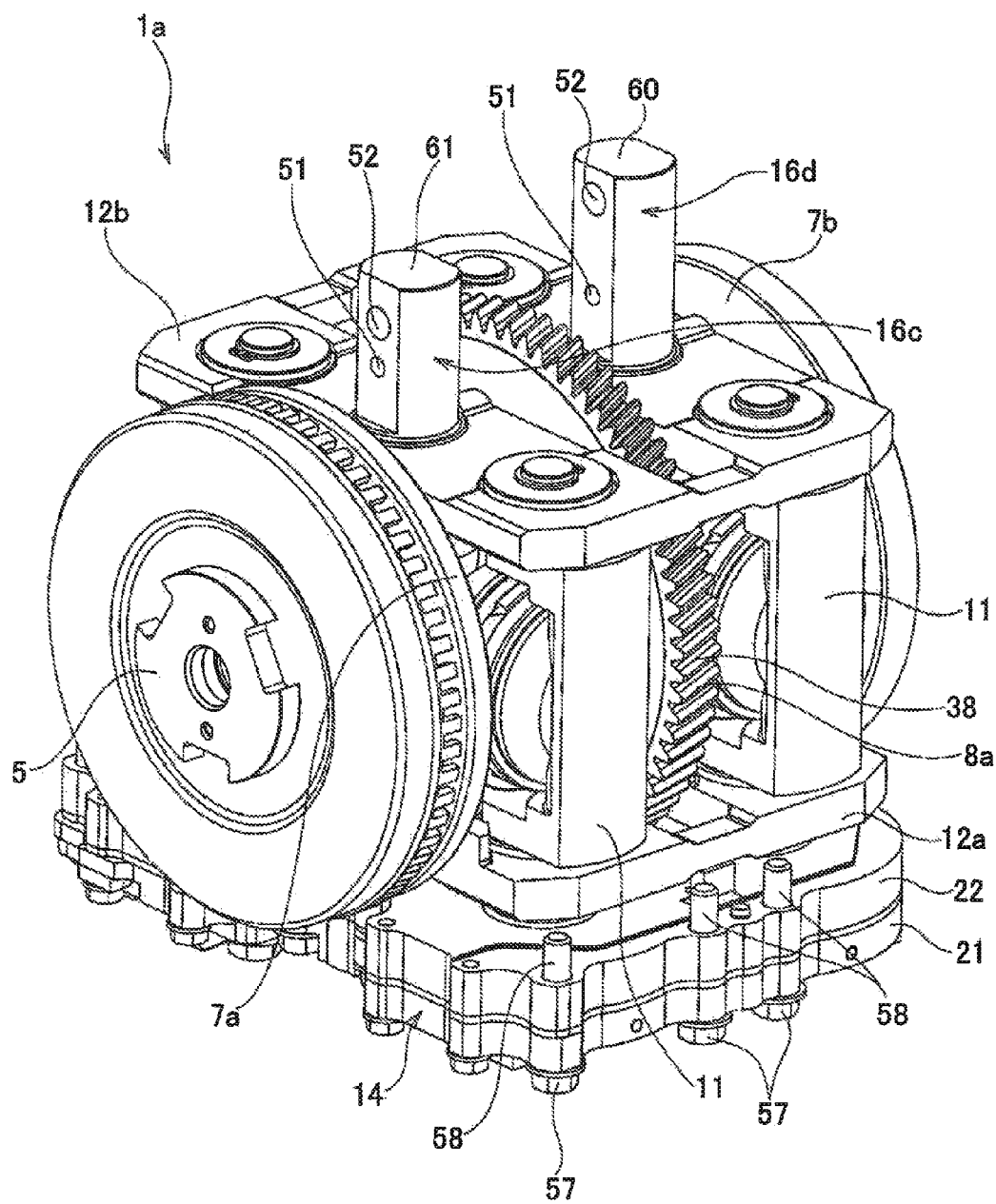
FIG. 12 is a perspective view similar to FIG. 10 of a fourth reference example related to the present invention.
Figure 13:
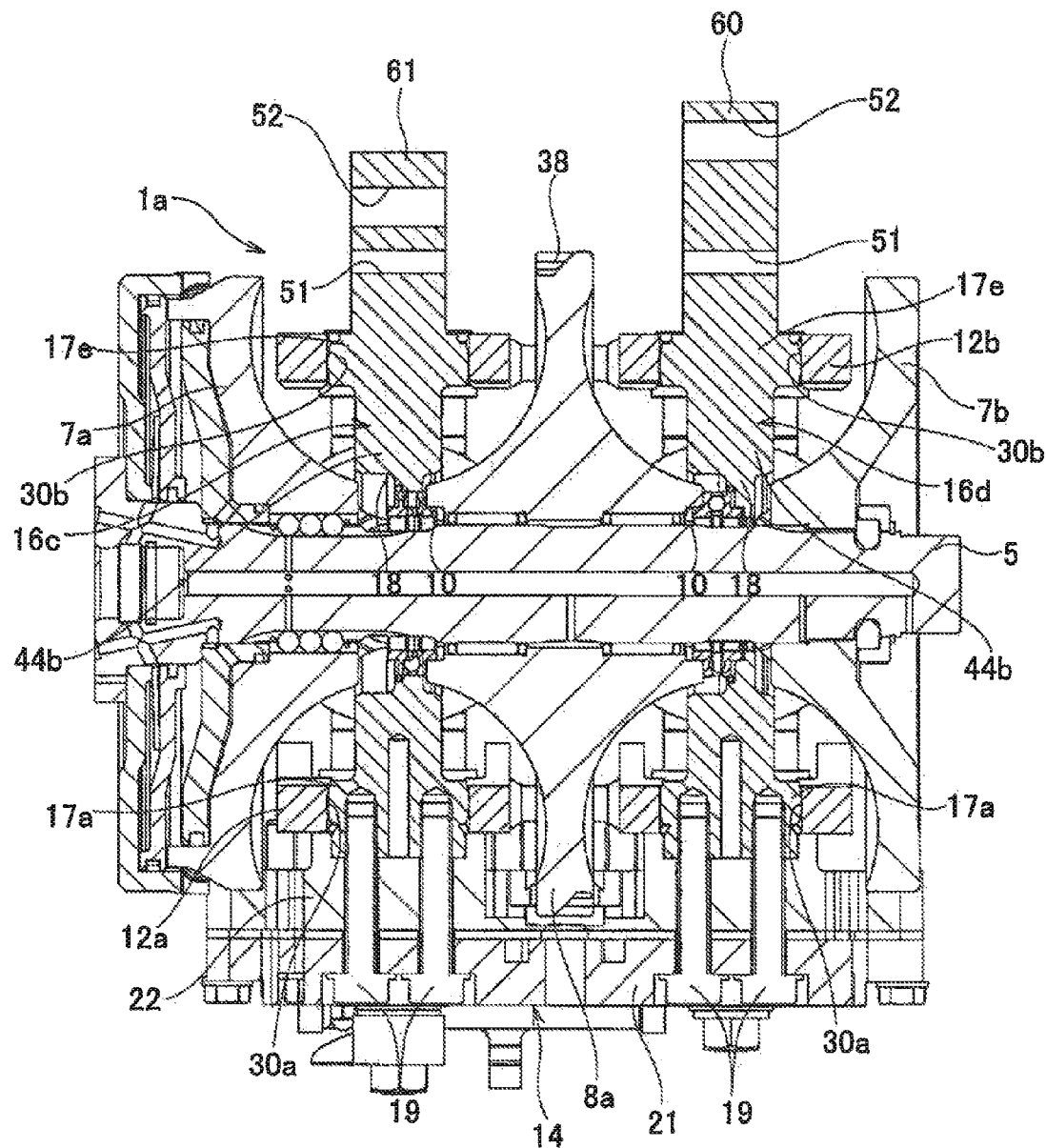
FIG. 13 is a cross-sectional view of a fourth reference example.

FIG. 12 and FIG. 13 illustrate a fourth reference example related to the present invention. In this reference example, the amount that a first installation section 60 that is provided on the top end section of one support column 16d that exists on the side opposite of the casing 13 from the side where the casing 13 is open in the axial direction (right side in FIG. 13) protrudes upward from the support plate 12b is greater than the amount that a second installation section 61 that is provided on the top end section of the other support column 16c protrudes upward from the support plate 12b. To correspond to this, the amount that a first anchor section (not illustrated in the figure) for joining and fastening the first installation section 60 protrudes downward from the inner surface of the casing 13 is less than the amount that a second anchor section (not illustrated in the figure) for joining and fastening the second installation section 61 protrudes downward from the inner surface of the casing 13. The first installation section 60 and the first anchor section are joined and fastened by a bolt that is inserted in the axial direction from the open side in the axial direction of the casing 13, and the second installation section 61 and second anchor section are joined and fastened by a bolt that is inserted in the axial direction from the open side in the axial direction of the casing 13. In this reference example, the work of inserting and tightening the bolt for joining and fastening the first installation section 60 and the first anchor section, and the bolt for joining and fastening the second installation section 61 and the second anchor section can be performed more easily than in the case of the third reference example. The construction and function of the other portion are the same as those of the third reference example.

Figure 14:
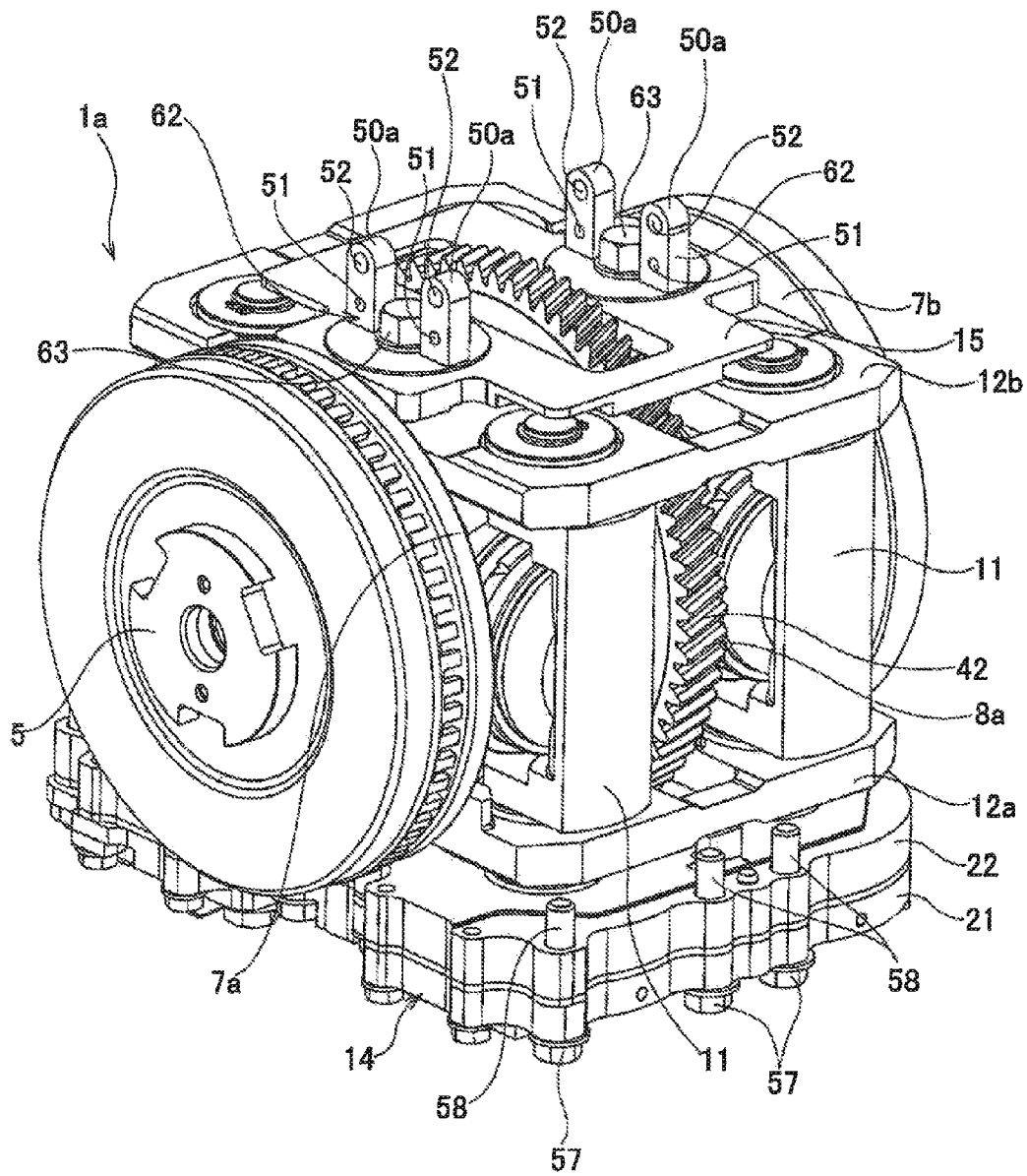
FIG. 14 is a perspective view similar to FIG. 10 of a fifth reference example related to the present invention.
Figure 15:
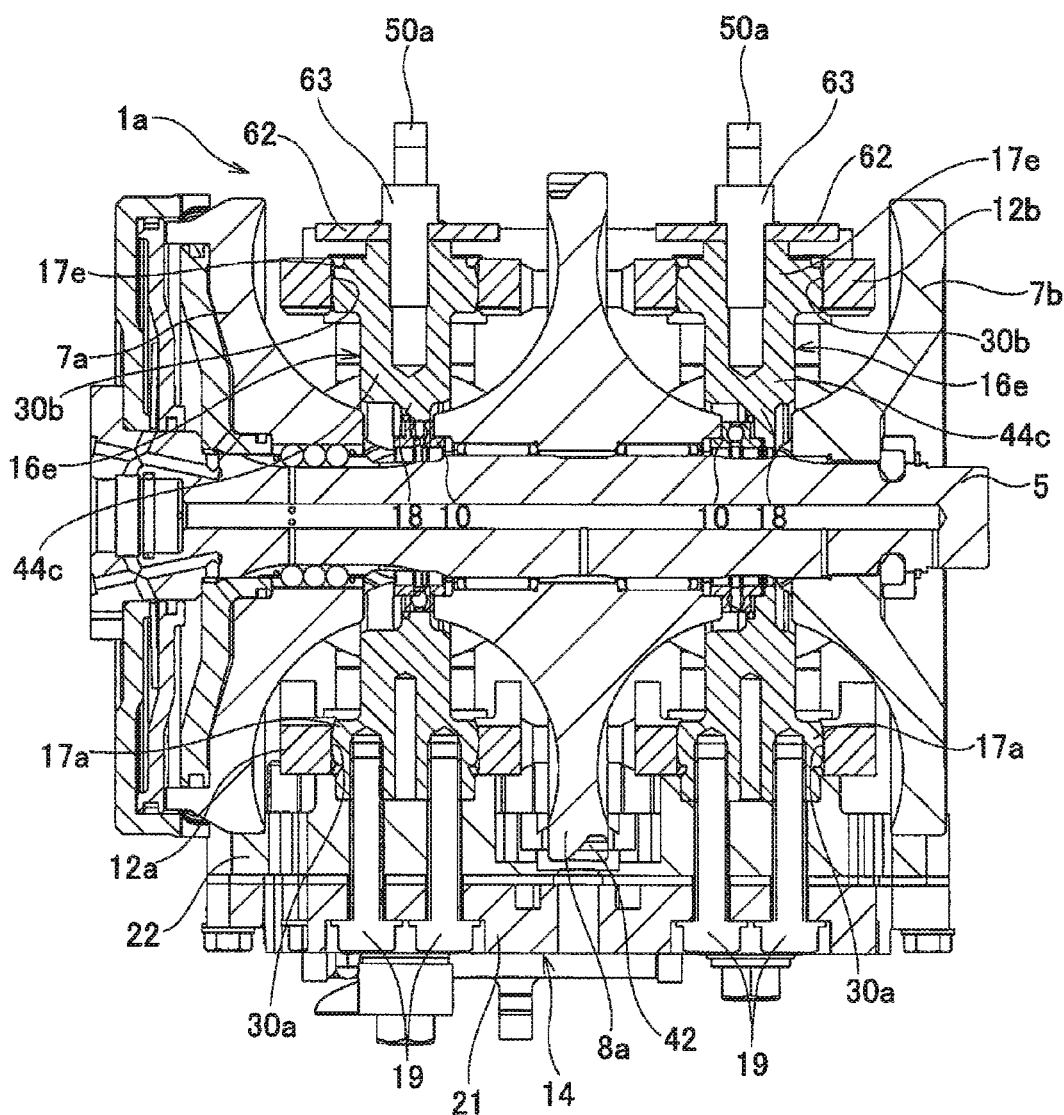
FIG. 15 is a cross-sectional view of a fifth reference example.

FIG. 14 and FIG. 15 illustrate a fifth reference example related to the present invention. In this reference example, installation brackets 62 are joined and fastened to the top end sections 44c of the pair of support columns 16e with bolts 63, and protrude from the top surface of the top-side support plate 12b. A pair of installation sections 50a are respectively provided on the top surfaces of the installation brackets 62 and are located on both sides of the center axes of the support columns 16e. Through holes 52 through which bolts 59 (see FIG. 11) are inserted are formed in the top-end sections of the installation sections 50a, and through holes 51 into which positioning pins 53 are press-fitted are formed in the middle sections of the installation sections 50a. Anchor sections (not illustrated in the figures) that have a shape that corresponds to the installations sections 50a are formed in the inner surface of a casing 13a (see FIG. 11) so as to correspond to the position and shape of the installation sections 50a. The other construction and functions are the same as those of the third reference example.

Figure 16:
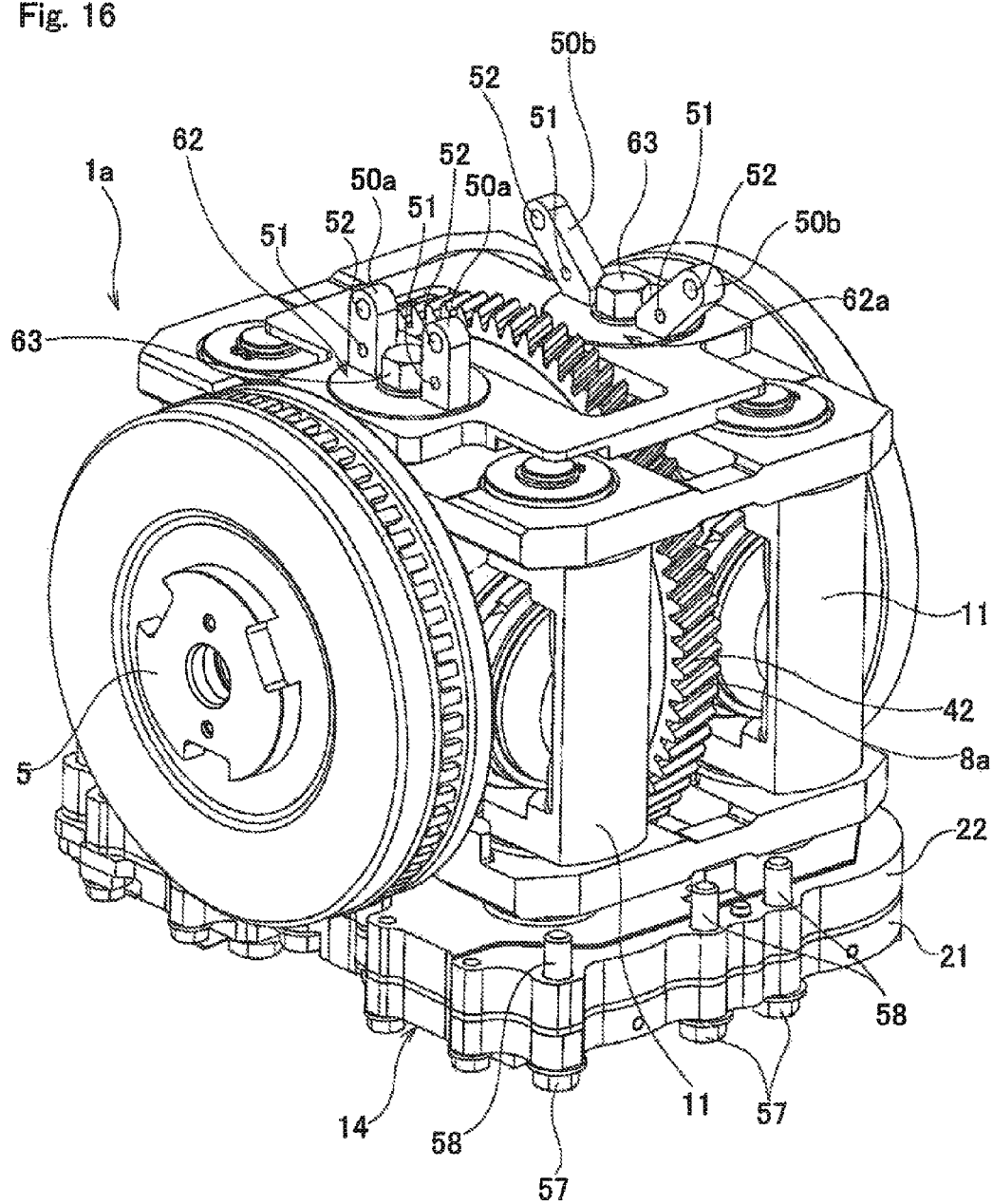
FIG. 16 is a perspective view similar to FIG. 10 of a sixth reference example related to the present invention.
Figure 17:
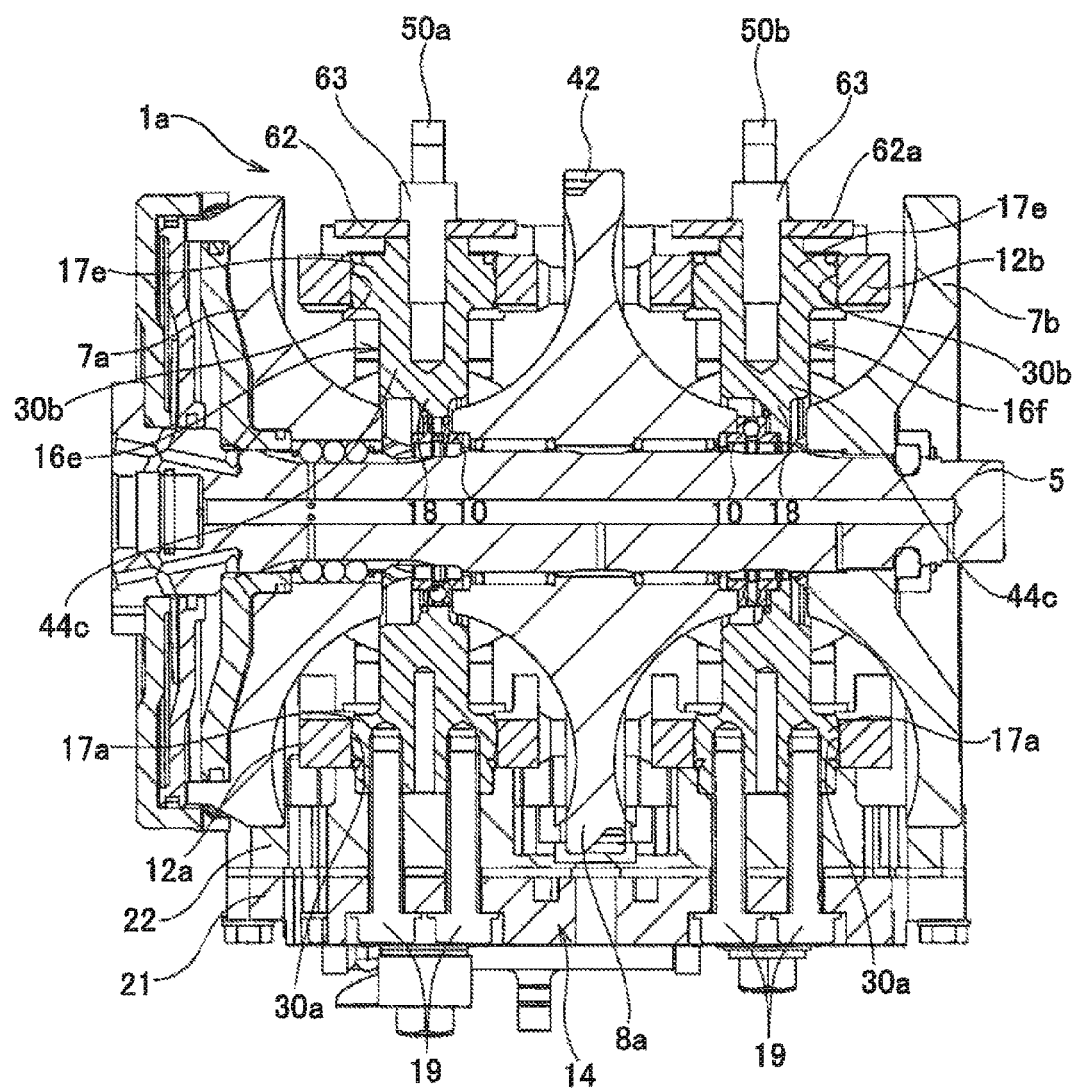
FIG. 17 is a cross-sectional view of a sixth reference example.
Figure 18:
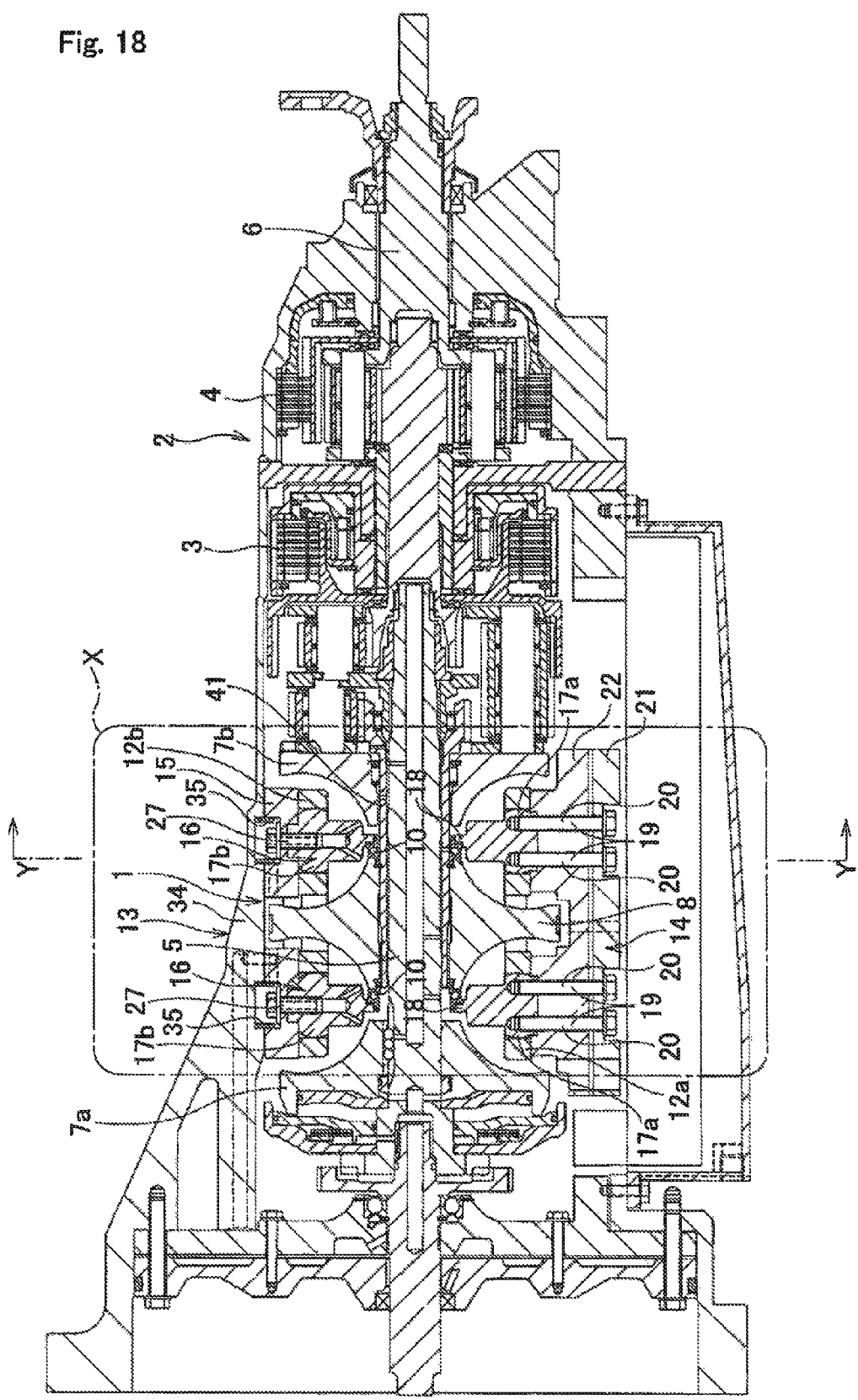
FIG. 18 is a cross-sectional view illustrating an example of conventional construction.
Figure 19:
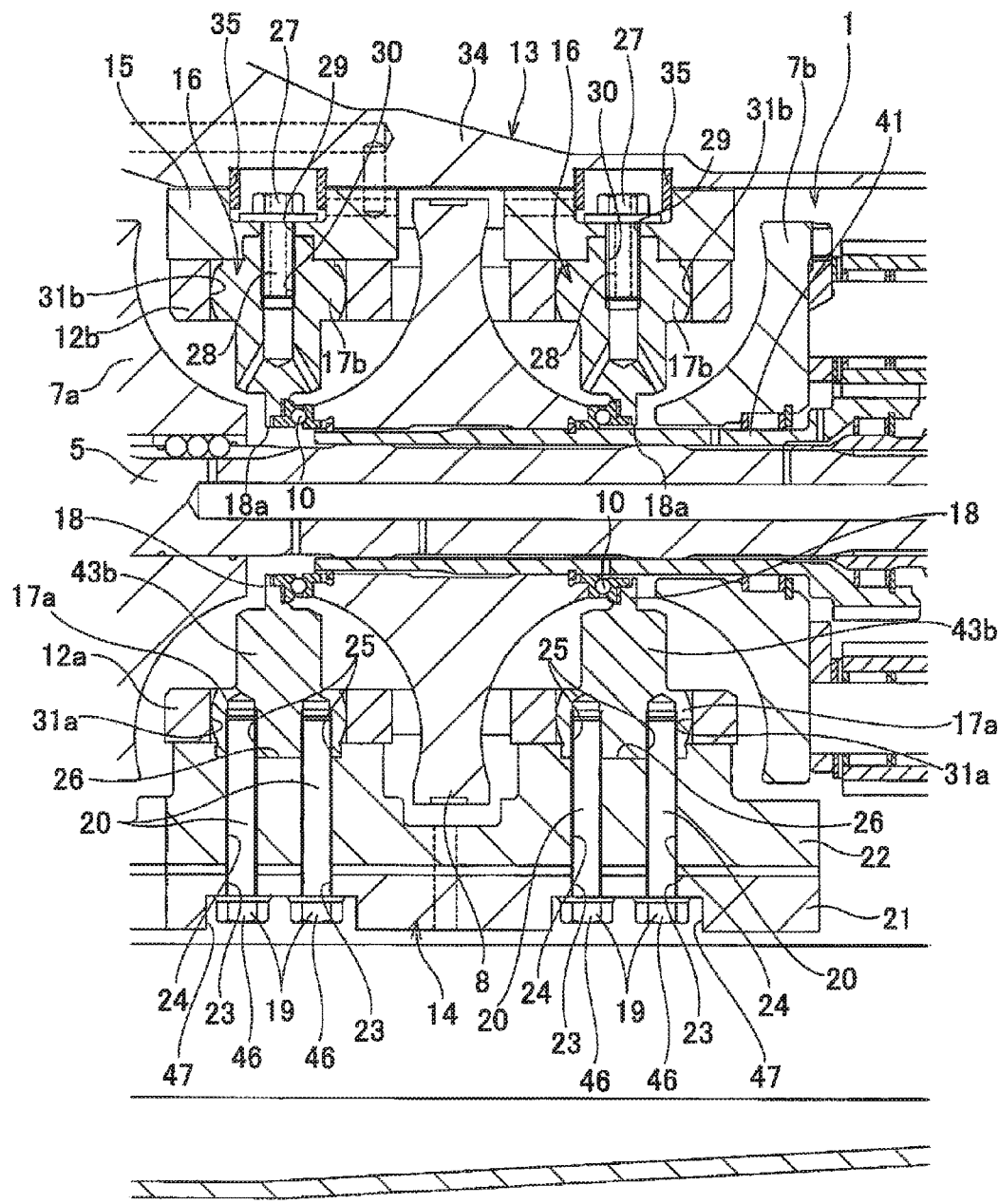
FIG. 19 is an enlarged view of area X in FIG. 18.
Figure 20:
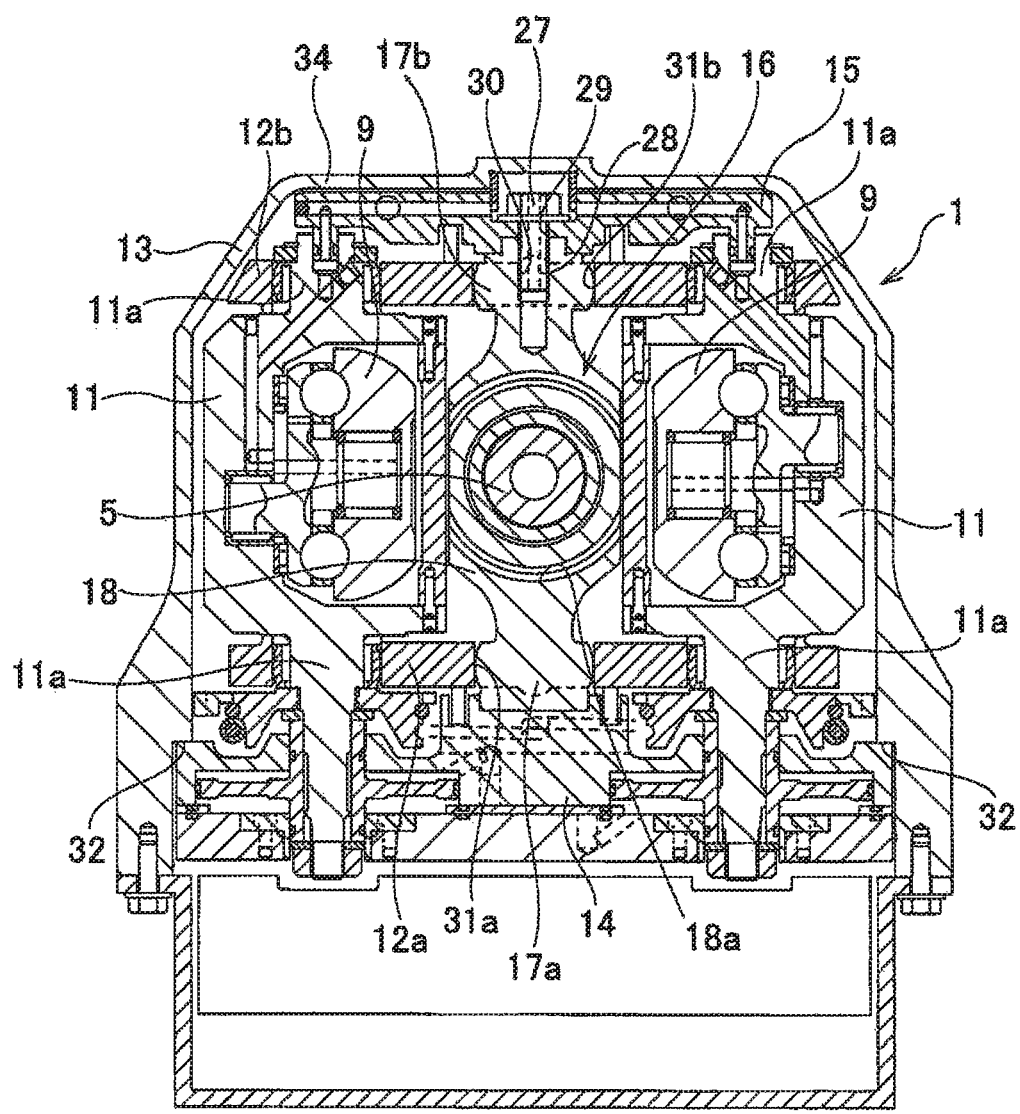
FIG. 20 is a cross-sectional view of section Y-Y in FIG. 18.
Figure 21:
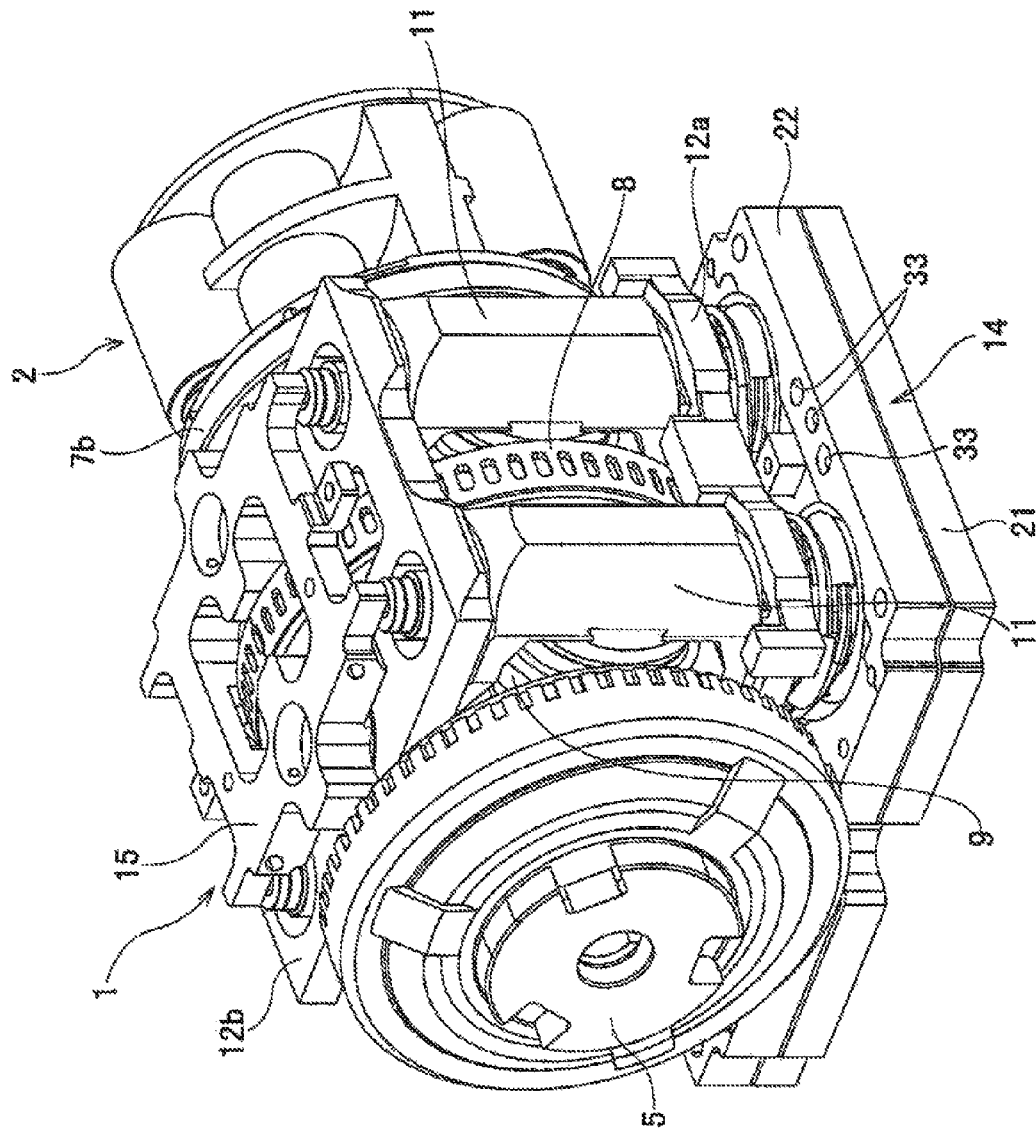
FIG. 21 is a perspective view of the construction illustrated in FIG. 17, and illustrates a module after the main parts of the toroidal continuously variable transmission have been assembled, and before assembly inside the casing.
Figure 22:
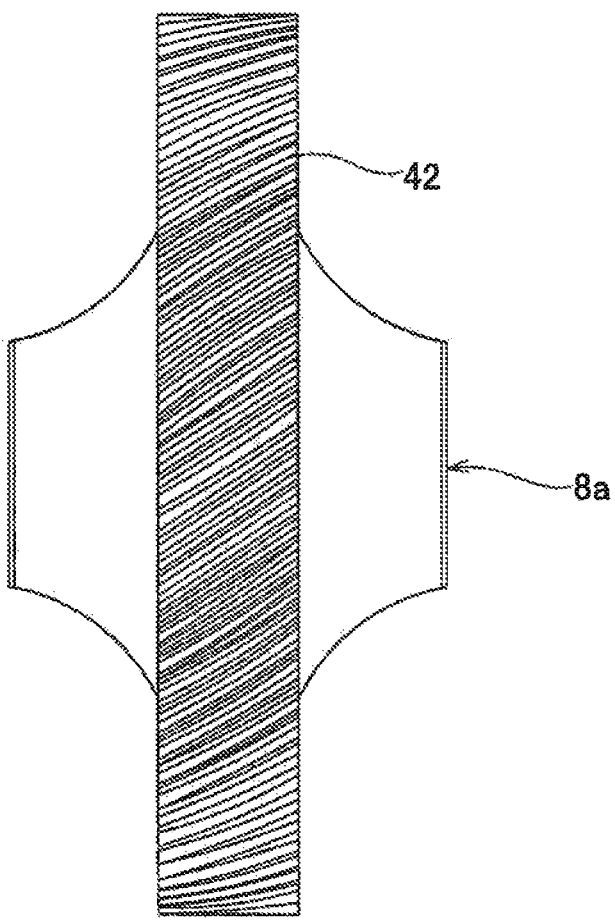
FIG. 22 is a side view of a different example of an output disk that can be applied to the conventional construction.

FIG. 16 and FIG. 17 illustrate a sixth reference example related to the present invention. In this example as well, installation brackets 62, 62a are joined and fastened to the top end sections 44c of a pair of support columns 16e, 16f using bolts 63. In this reference example, the installation sections 50a of the installation bracket 62 that is joined and fastened to the top end section 44c of one support column 16e (left support column in FIG. 16. and FIG. 17), and the installation sections 50b of the installation bracket 62a that is joined and fastened to the top end section 44c of the other support column 16f (right support column in FIG. 16 and FIG. 17) are provided so as not to overlap each other in the axial direction. In order for this, the installation sections 50a on the side of the one support column 16e is provided so as to be parallel to the center axis of the one support column 16e, and the installation sections 50b on the side of the other support column 16f is provided so as to be inclined with respect to the center axis of the other support column 16f. As a result, the work of inserting and tightening the bolts for joining and fastening the installation sections 50a, 50b to the anchor sections (not illustrated in the figures) can be performed easier than in the fifth reference example. The other construction and function are the same as those of the fifth reference example.

The first thru sixth reference examples can be applied individually, or as long as there is no contradiction with each other, can be combined and applied to the first and second examples of embodiments of the present invention.

The present invention can be applied to not only automobile transmissions, but can be widely applied to toroidal continuously variable transmissions and continuously variable transmission apparatuses that use toroidal continuously variable transmissions that are used in transmissions of various kinds of industrial machinery.

What is claimed is:

1. A toroidal continuously variable transmission, comprising:

a casing;

a rotating shaft rotatably supported inside the casing;

a pair of outside disks supported by both end sections of the rotating shaft so that one side surfaces thereof respectively having an arc shaped cross section, face each other, to rotate in synchronization with the rotating shaft;

an inside disk supported around the middle section of the rotating shaft so that both side surfaces in the axial direction thereof respectively having an arc shaped cross section, face the one side surfaces in the axial direction of the pair of outside disks, to rotate freely with respect to the rotating shaft;

support members comprising rolling shafts provided on both end sections in skewed positions with respect to the rotating shaft, with plural support members being provided in the axial direction between the both side surfaces in the axial direction of the inside disk and the one side surfaces in the axial direction of the pair of outside disk so as to be able to oscillating move around the center axes of the rolling shafts;

a pair of support plates supporting the rolling shafts;

power rollers rotatably supported by the support members, and so that the circumferential surfaces thereof, which are spherical convex surfaces, come in contact with the both sides side surfaces in the axial direction of the inside disk and the one side surfaces in the axial direction of the pair of outside disks;

plural actuators for causing the support members to displace in the axial direction of the rolling shafts;

an actuator body housing the main-unit sections of the actuators; and a pair of support columns respectively comprising: a support-ring section having a circular through hole through which the rotating shaft is inserted, and supporting the end sections in the axial direction of the inside disk; and a pair of support-post sections concentrically provided in portions on both sides in the radial direction of the through holes of the support-ring section, and supporting the pair of support plates, the support columns arranged between the both side surfaces in the axial direction of the inside disk and the one side surface in the axial direction of the outside disks in the state that the rotating shaft is inserted through the through holes in the support-ring sections; and one end sections of the pair of support columns supported with respect to the actuator body by installation members arranged in the axial direction of the pair of outside disks and the inside disk, and the other end sections supported with respect to the casing or a member fastened to the casing by an installation members arranged in the axial direction of the pair of outside disks and the inside disk.

2. The toroidal continuously variable transmission according to claim 1, wherein the inside disk is a single integrated output disk provided with an output gear for taking out rotation of the output disk around the outer-circumferential edge of the output disk.

3. The toroidal continuously variable transmission according to claim 1, wherein installation-plate sections are provided in portions of both end sections of the pair of support columns, the installation-plate sections located further outward in the radial direction than the outer circumferential edges of the pair of outside disks and the inside disk, and protruding from the support plates; and anchor sections are provided in portions of the actuator body and casing, or member fastened to the casing, the anchor sections facing the installation-plate sections in the axial direction in the assembled state; and the installation plate sections are joined to the anchor sections by the installation members.

4. The toroidal continuously variable transmission according to claim 3, wherein the installation members are bolts, through holes are provided in the installation-plate sections, and screw holes are provided in the anchor sections, and the installation-plate sections are joined to the anchor sections by screwing the bolts that are inserted through the through holes into the screw holes and further tightening.

5. The toroidal continuously variable transmission according to claim 3, wherein of the installation members, the installation members for supporting one support column of the pair of support columns are bolts, first through hole are provided in the installation-plate sections of the one support column, and screw holes are provided in the anchor sections provided in portions facing the installation-plate sections of the one support column in the axial direction, and the installation-plate sections of the one support column are joined to the anchor sections by screwing the bolts inserted through the first through holes into the screw holes and further tightening; and of the installation members, the installation members for supporting the other support column of the pair of support columns are pins, second through holes are provided in the installation-plate sections of the other support column, and installation holes are provided in the anchor sections provided in portions facing in the axial direction the installation plate sections of the other support column, and the installation-plate sections of the other support column are joined to the anchor sections by inserting the pins inserted through the second through holes into the installation holes.

6. A continuously variable transmission apparatus, comprising:

a toroidal continuously variable transmission, and a differential-gear unit formed by a combination of plural gears;

the differential-gear unit comprising: a first input unit rotated and driven by the rotating shaft together with the pair of outside disks of the toroidal continuously variable transmission; and a second input unit connected to the inside disk; wherein rotation is obtained and transmitted to the output shaft according to the speed difference between the first input unit and the second input unit; and the toroidal continuously variable transmission is the toroidal continuously variable transmission according to claim 1.

* * * * *